(12) United States Patent
Onishi et al.

(10) Patent No.: US 7,884,927 B2
(45) Date of Patent: Feb. 8, 2011

(54) POWER TRANSMISSION CONTROL DEVICE, NON-CONTACT POWER TRANSMISSION SYSTEM, POWER TRANSMITTING DEVICE, ELECTRONIC INSTRUMENT, AND WAVEFORM MONITOR CIRCUIT

(75) Inventors: Kota Onishi, Nagoya (JP); Masayuki Kamiyama, Nagoya (JP); Nobutaka Shiozaki, Nagoya (JP); Takahiro Kamijo, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 12/349,253

(22) Filed: Jan. 6, 2009

(65) Prior Publication Data
US 2009/0175060 A1 Jul. 9, 2009

(30) Foreign Application Priority Data
Jan. 7, 2008 (JP) ............................. 2008-000383
Nov. 7, 2008 (JP) ............................. 2008-286285

(51) Int. Cl.
*G01N 21/00* (2006.01)
*H04B 1/38* (2006.01)
(52) U.S. Cl. ..................... 356/73.1; 455/572
(58) Field of Classification Search .............. 363/17; 455/572; 330/253; 356/73.1
See application file for complete search history.

(56) References Cited

U.S. PATENT DOCUMENTS 4,463,646 A * 8/1984 Mitarai ..................... 84/617

FOREIGN PATENT DOCUMENTS

JP      A-2006-060909     3/2006

\* cited by examiner

*Primary Examiner*—Shawn Riley
(74) *Attorney, Agent, or Firm*—Oliff & Berridge PLC

(57) ABSTRACT

A power transmission control device includes a power-transmitting-side control circuit that controls an operation of a power transmitting device, a driver control circuit that controls operations of a first power transmitting driver and a second power transmitting driver, and a waveform detection circuit that performs a waveform detection process based on a monitor signal from a waveform monitor circuit. The first power transmitting driver drives a first node of a primary coil directly, and the second power transmitting driver drives a second node of the primary coil through a capacitor. A switch circuit is provided in the waveform monitor circuit, the switch circuit being situated in a signal path between the primary coil and a low-level power supply potential. The power-transmitting-side control circuit causes the switch circuit to be turned ON/OFF using a switch control signal.

12 Claims, 11 Drawing Sheets

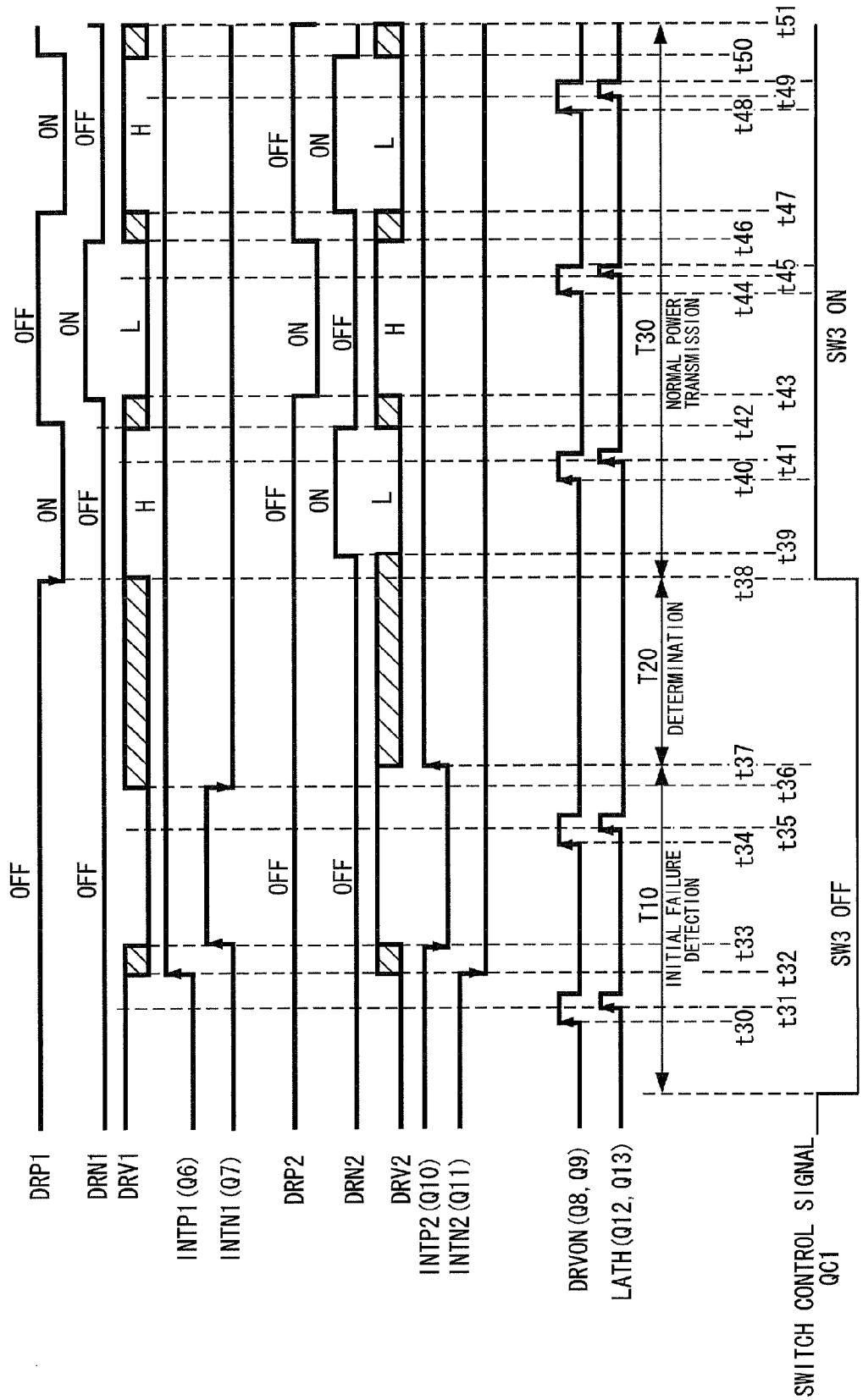

POWER TRANSMISSION CONTROL DEVICE, NON-CONTACT POWER TRANSMISSION SYSTEM, POWER TRANSMITTING DEVICE, ELECTRONIC INSTRUMENT, AND WAVEFORM MONITOR CIRCUIT

Japanese Patent Application No. 2008-000383 filed on Jan. 7, 2008 and Japanese Patent Application No. 2008-286285 filed on Nov. 7, 2008, are hereby incorporated by reference in their entirety.

BACKGROUND

The present invention relates to a power transmission control device, a non-contact power transmission system, a power transmitting device, an electronic instrument, a waveform monitor circuit, and the like.

In recent years, non-contact power transmission (contactless power transmission) that utilizes electromagnetic induction to enable power transmission without metal-to-metal contact has attracted attention. As application examples of non-contact power transmission, charging a portable telephone, charging a household appliance (e.g., cordless telephone handset), and the like have been proposed.

JP-A-2006-60909 discloses a non-contact power transmission device using a primary coil and a secondary coil, for example. In the non-contact power transmission system disclosed in JP-A-2006-60909, a driver having a CMOS configuration (CMOS driver) is used as a driver that drives the primary coil, and a control circuit (timing control circuit) that prevents a shoot-through current is provided corresponding to each CMOS driver. The control circuit (timing control circuit) prevents a shoot-through current by preventing a situation in which the PMOS transistor and the NMOS transistor are turned ON simultaneously. It is effective to prevent a shoot-through current in the primary-side driver in order to prevent the driver from breaking down.

In the non-contact power transmission system disclosed in JP-A-2006-60909, a shoot-through current can be prevented by adjusting the drive timing of each transistor of the driver that drives the primary coil. However, JP-A-2006-60909 does not take measures against a short-circuit failure of each transistor.

For example, when a transistor that forms the CMOS driver has undergone an initial failure, it is desirable to detect the initial failure before performing a normal drive operation and take prompt and appropriate measures (e.g., collecting and repairing the instrument) without performing the normal drive operation from the viewpoint of safety. On the other hand, various circuits may be connected to the primary coil. Therefore, when detecting an initial failure, a stable and reliable novel failure detection method taking the operation of the circuit connected to the primary coil into consideration is necessary.

Another circuit (e.g., waveform detection circuit) is also connected to the primary coil. Therefore, in order to accurately detect an initial failure, the effects of another circuit connected to the primary coil must be taken into consideration.

SUMMARY

According to one aspect of the invention, there is provided a power transmission control device provided in a power transmitting device of a non-contact power transmission system, the non-contact power transmission system transmitting power from the power transmitting device to a power receiving device by electromagnetically coupling a primary coil and a secondary coil to transmit the power to a load of the power receiving device, the power transmission control device comprising:

a power-transmitting-side control circuit that controls an operation of the power transmitting device;

a driver control circuit that controls operations of a first power transmitting driver and a second power transmitting driver provided in a power transmitting section of the power transmitting device; and a waveform detection circuit that performs a waveform detection process based on a monitor signal from a waveform monitor circuit that monitors at least one of a voltage and a current of the primary coil, the first power transmitting driver driving a first node of the primary coil directly, and the second power transmitting driver driving a second node of the primary coil through a capacitor;

a switch circuit being provided in the waveform monitor circuit, the switch circuit being situated in a signal path between the primary coil and a low-level power supply potential; and the power-transmitting-side control circuit causing the switch circuit to be turned ON/OFF using a switch control signal.

According to another aspect of the invention, there is provided a non-contact power transmission system comprising a power transmitting device and a power receiving device, the non-contact power transmission system transmitting power from the power transmitting device to the power receiving device by electromagnetically coupling a primary coil and a secondary coil to transmit the power to a load of the power receiving device, the power transmitting device including:

a power transmitting section that includes a first power transmitting driver and a second power transmitting driver;

a power transmission control device that controls an operation of the power transmitting device; and a waveform monitor circuit that monitors at least one of a voltage and a current of the primary coil, a switch circuit being provided in the waveform monitor circuit, the switch circuit being situated in a signal path between the primary coil and a low-level power supply potential, the power transmission control device including:

a power-transmitting-side control circuit that controls an operation of the power transmitting device;

a driver control circuit that controls operations of the first power transmitting driver and the second power transmitting driver; and a waveform detection circuit that performs a waveform detection process based on a monitor signal from the waveform monitor circuit, the first power transmitting driver driving a first node of the primary coil directly, and the second power transmitting driver driving a second node of the primary coil through a capacitor, the power-transmitting-side control circuit causing the switch circuit provided in the waveform monitor circuit to be turned ON/OFF using a switch control signal; and the power receiving device including:

a power receiving section that includes a rectifier circuit that rectifies an induced voltage in the secondary coil;

a load modulation section that is used to transmit data from the power receiving device to the power transmitting device; and a power supply control section that controls power supply to the load.

According to another aspect of the invention, there is provided a power transmitting device comprising:
the above power transmission control device;
the power transmitting section that includes the first power transmitting driver and the second power transmitting driver that drive the primary coil; and
the waveform monitor circuit that includes the switch circuit.

According to another aspect of the invention, there is provided a power transmitting device comprising:
the above power transmission control device;
the power transmitting section that includes the first power transmitting driver and the second power transmitting driver that drive the primary coil, the first test driver that drives the first node of the primary coil, and the second test driver that drives the second node of the primary coil; and
the waveform monitor circuit that includes the switch circuit.

According to another aspect of the invention, there is provided an electronic instrument comprising the above power transmitting device.

According to another aspect of the invention, there is provided an electronic instrument comprising the above power transmitting device.

According to another aspect of the invention, there is provided a waveform monitor circuit provided in a power transmitting device of a non-contact power transmission system, the non-contact power transmission system transmitting power from the power transmitting device to a power receiving device by electromagnetically coupling a primary coil and a secondary coil, the waveform monitor circuit monitoring at least one of a voltage and a current of the primary coil, the waveform monitor circuit comprising:
a resistor that has one end and the other end, the one end being electrically connected to the primary coil; and
a switch circuit provided in a signal path situated between the other end of the resistor and a low-level power supply potential.

BRIEF DESCRIPTION OF THE DRAWINGS

FIG. 11 is a timing diagram showing an example of a specific operation timing of the power transmitting device shown in FIG. 10.

DESCRIPTION OF EXEMPLARY EMBODIMENTS

Figure 1A:
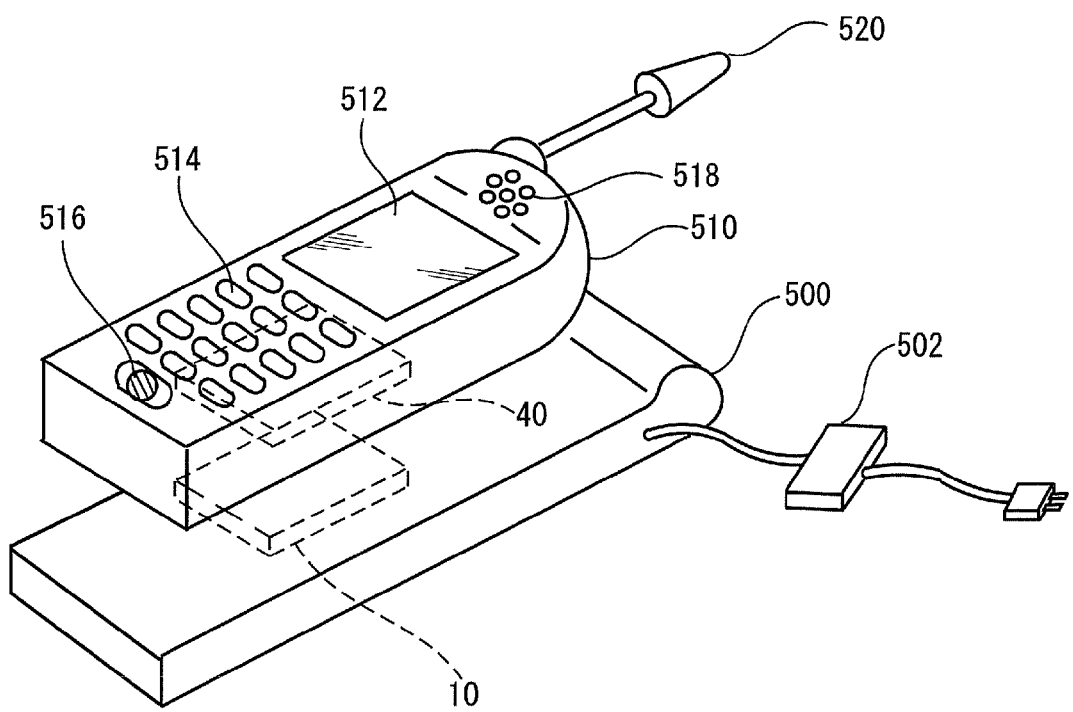
FIGS. 1A and 1B are views showing examples of an electronic instrument utilizing non-contact power transmission.

Several embodiments of the invention may implement a non-contact power transmission system in which a failure can be detected stably and reliably while taking the operation of another circuit connected to a primary coil into consideration.

(1) According to one embodiment of the invention, there is provided a power transmission control device provided in a power transmitting device of a non-contact power transmission system, the non-contact power transmission system transmitting power from the power transmitting device to a power receiving device by electromagnetically coupling a primary coil and a secondary coil to transmit the power to a load of the power receiving device, the power transmission control device comprising:
a power-transmitting-side control circuit that controls an operation of the power transmitting device;
a driver control circuit that controls operations of a first power transmitting driver and a second power transmitting driver provided in a power transmitting section of the power transmitting device; and
a waveform detection circuit that performs a waveform detection process based on a monitor signal from a waveform monitor circuit that monitors at least one of a voltage and a current of the primary coil,
the first power transmitting driver driving a first node of the primary coil directly, and the second power transmitting driver driving a second node of the primary coil through a capacitor;
a switch circuit being provided in the waveform monitor circuit, the switch circuit being situated in a signal path between the primary coil and a low-level power supply potential; and
the power-transmitting-side control circuit causing the switch circuit to be turned ON/OFF using a switch control signal.

The switch circuit is provided in the waveform monitor circuit connected to the primary coil, and is ON/OFF-controlled using the switch control signal output from the power-transmitting-side control circuit of the power transmission control device. The capacitor is provided on only one end of the primary coil. An LC series-resonant circuit can be formed by the primary coil and one capacitor. It is unnecessary to provide a capacitor on each end of the primary coil insofar as the breakdown voltage of the capacitor is sufficient. A reduction in capacitor loss, a reduction in number of parts, and a reduction in mounting area of the power transmitting section can be achieved by reducing the number of capacitors.

When a capacitor connected to one end of the primary coil is omitted, the first node of the primary coil and the waveform monitor circuit are DC-connected directly. Therefore, a direct current may flow from the primary coil to the low-level power supply potential (e.g., ground) through the waveform monitor circuit when measuring the direct-current voltage (direct current) of the first node of the primary coil so that the measurement accuracy may decrease. In this case, the switch circuit provided in the waveform monitor circuit is turned OFF.

The signal path that connects the primary coil and the low-level power supply potential (e.g., ground) is cut by causing the switch circuit to be turned OFF. Therefore, an unnecessary current does not flow. Therefore, the measurement accuracy of the voltage or current of the primary coil does not deteriorate.

It is necessary to measure the direct-current voltage (direct current) of the primary coil when diagnosing an initial failure of the power transmitting driver, for example. Note that the above configuration may also be applied to other applications. For example, since it is necessary to accurately measure the voltage of the primary coil when evaluating the performance of the power transmitting driver or measuring the breakdown voltage of the capacitor that forms a series-resonant circuit, the above configuration may be utilized. Note that the above configuration may also be applied to other applications.

When a circuit other than the waveform monitor circuit is connected to the primary coil and a leakage current may occur in the circuit other than the waveform monitor circuit, it is effective to provide the switch circuit in the circuit other than the waveform monitor circuit. Accordingly, the waveform monitor circuit may be referred to as "at least one circuit connected to the primary coil".

(2) In the power transmission control device, the switch circuit may be provided in each of a plurality of signal paths that are provided in the waveform monitor circuit and situated between the primary coil and the low-level power supply potential.

When a plurality of signal paths through which a direct current flows toward the low-level power supply potential are present in parallel, the switch circuit is provided in each of the signal paths, and each switch circuit is controlled based on the switch control signal from the power-transmitting-side control circuit. Therefore, a situation in which an unnecessary direct current leaks toward the low-level power supply potential (e.g., ground) when measuring the direct-current voltage (direct current) of the primary coil is prevented. As a result, accurate measurement can be achieved.

(3) In the power transmission control device, the power transmitting section may include a first test driver that drives the first node of the primary coil, and a second test driver that drives a third node, the third node being a common connection node of an output node of the second power transmitting driver and one electrode of the capacitor, the power-transmitting-side control circuit may cause the switch circuit to be turned OFF using the switch control signal when detecting an initial failure of the first power transmitting driver and the second power transmitting driver using the first test driver and the second test driver.

When detecting a failure of the first and second power transmitting drivers using the test drivers, it is important to determine whether or not a leakage current that exceeds the allowable value occurs in the transistors that form the first and second power transmitting drivers (note that failure detection is not limited thereto), for example.

For example, when the amount of leakage current exceeds the allowable value to some extent, a failure has occurred in the power transmitting driver. Therefore, it is necessary to accurately determine that a failure has occurred in the power transmitting driver. Therefore, it is necessary to accurately detect an initial failure. Even if the amount of direct current that flows toward ground through another circuit such as the waveform monitor circuit is small, accurate determination may be hindered due to an error caused by the unnecessary direct current.

According to the above embodiment, an initial failure can be accurately diagnosed by causing the switch circuit to be turned OFF when diagnosing an initial failure of the power transmitting driver to completely cut off a direct current that may cause an error.

(4) In the power transmission control device, the power-transmitting-side control circuit may set input signals input to the first power transmitting driver and the second power transmitting driver at such levels that the first node and the third node of the primary coil are set in a floating state, then may cause the first test driver and the second test driver to drive the first node and the third node of the primary coil respectively, and may determine that an initial failure has occurred in the first power transmitting driver or the second power transmitting driver when a voltage of the first node or the third node is not a voltage corresponding to a drive output level of the first test driver or the second test driver.

When diagnosing an initial failure of the power transmitting driver, the input level of each transistor of the first and second power transmitting driver is adjusted so that each transistor is turned OFF. Therefore, the output terminals of the first and second power transmitting drivers are set in a floating state. The primary coil is then driven by the test driver. Since the first and second power transmitting drivers are incompetent, the voltage of each of the first and third nodes is controlled by the test driver. The voltage of each of the first and third nodes should change corresponding to the output level of the test driver.

When an initial failure has occurred in the first or second power transmitting driver (e.g., the transistor is short-circuited or the leakage current of the transistor is larger than a normal value), the voltage of the first or third node does not coincide with the output voltage of the test driver due to a leakage current of the transistor that has broken down. Therefore, an initial failure can be detected.

(5) According to another embodiment of the invention, there is provided a non-contact power transmission system comprising a power transmitting device and a power receiving device, the non-contact power transmission system transmitting power from the power transmitting device to the power receiving device by electromagnetically coupling a primary coil and a secondary coil to transmit the power to a load of the power receiving device, the power transmitting device including:

a power transmitting section that includes a first power transmitting driver and a second power transmitting driver;

a power transmission control device that controls an operation of the power transmitting device; and a waveform monitor circuit that monitors at least one of a voltage and a current of the primary coil, a switch circuit being provided in the waveform monitor circuit, the switch circuit being situated in a signal path between the primary coil and a low-level power supply potential, the power transmission control device including:

a power-transmitting-side control circuit that controls an operation of the power transmitting device;

a driver control circuit that controls operations of the first power transmitting driver and the second power transmitting driver; and a waveform detection circuit that performs a waveform detection process based on a monitor signal from the waveform monitor circuit, the first power transmitting driver driving a first node of the primary coil directly, and the second power transmitting driver driving a second node of the primary coil through a capacitor, the power-transmitting-side control circuit causing the switch circuit provided in the waveform monitor circuit to be turned ON/OFF using a switch control signal; and the power receiving device including:

a power receiving section that includes a rectifier circuit that rectifies an induced voltage in the secondary coil;

a load modulation section that is used to transmit data from the power receiving device to the power transmitting device; and a power supply control section that controls power supply to the load.

In the non-contact power transmission system according to this embodiment, the capacitor is connected to only one end of the primary coil. An LC series-resonant circuit can be formed by the primary coil and one capacitor. It is unnecessary to provide a capacitor on each end of the primary coil insofar as the breakdown voltage of the capacitor is sufficient. A reduction in capacitor loss, a reduction in number of parts, and a reduction in mounting area of the power transmitting section can be achieved by reducing the number of capacitors. This is advantageous in implementing a small non-contact power transmission system.

The switch circuit is provided in the waveform monitor circuit connected to the primary coil, and the switch circuit is ON/OFF-controlled using the switch control signal output from the power-transmitting-side control circuit of the power transmission control device. For example, a leakage current that causes a measurement error can be cut completely by causing the switch circuit to be turned OFF when measuring the direct-current voltage or the direct current of the primary coil. This enables accurate measurement. Therefore, the reliability and the safety of the power transmitting device can be improved. Therefore, the reliability and the safety of the non-contact power transmission system are improved.

(6) In the non-contact power transmission system, the switch circuit may be provided in each of a plurality of signal paths that are provided in the waveform monitor circuit and situated between the primary coil and the low-level power supply potential.

When a plurality of signal paths through which a direct current flows toward the low-level power supply potential are present in the power transmitting device in parallel, the switch circuit is provided in each of the signal paths, and each switch circuit is controlled based on the switch control signal from the power-transmitting-side control circuit. Therefore, a situation in which an unnecessary direct current leaks toward the low-level power supply potential (e.g., ground) when measuring the direct-current voltage (direct current) of the primary coil is prevented. As a result, accurate measurement can be achieved.

(7) In the non-contact power transmission system, the power transmitting section may include a first test driver that drives the first node of the primary coil, and a second test driver that drives a third node, the third node being a common connection node of an output node of the second power transmitting driver and one electrode of the capacitor, the power-transmitting-side control circuit may cause the switch circuit to be turned OFF using the switch control signal when detecting an initial failure of the first power transmitting driver and the second power transmitting driver using the first test driver and the second test driver.

An initial failure can be accurately diagnosed by causing the switch circuit to be turned OFF when diagnosing an initial failure of the power transmitting driver to completely cut off a direct current that may cause an error. Therefore, the reliability and the safety of the non-contact power transmission system are improved.

(8) In the non-contact power transmission system, the power-transmitting-side control circuit may set input signals input to the first power transmitting driver and the second power transmitting driver at such levels that the first node and the third node of the primary coil are set in a floating state, then may cause the first test driver and the second test driver to drive the first node and the third node of the primary coil respectively, and may determine that an initial failure has occurred in the first power transmitting driver or the second power transmitting driver when a voltage of the first node or the third node is not a voltage corresponding to a drive output level of the first test driver or the second test driver.

When diagnosing an initial failure of the power transmitting driver, the input level of each transistor of the first and second power transmitting driver is adjusted so that each transistor is turned OFF. Therefore, the output terminals of the first and second power transmitting drivers are set in a floating state.

The primary coil is then driven by the test driver. Since the first and second power transmitting drivers are incompetent, the voltage of each of the first and third nodes is controlled by the test driver. The voltage of each of the first and third nodes should change corresponding to the output level of the test driver. When an initial failure has occurred in the first or second power transmitting driver (e.g., the transistor is short-circuited or the leakage current of the transistor is larger than a normal value), the voltage of the first or third node does not coincide with the output voltage of the test driver due to a leakage current of the transistor that has broken down.

Therefore, an initial failure of the power transmitting driver of the power transmitting section can be detected. Since a failure of the power transmitting device can be detected using a simple circuit, the reliability and the safety of the non-contact power transmission system are improved.

(9) According to another embodiment of the invention, there is provided a power transmitting device comprising:

the power transmission control device as defined in the above (1) or (2);

the power transmitting section that includes the first power transmitting driver and the second power transmitting driver that drive the primary coil; and the waveform monitor circuit that includes the switch circuit.

A reliable and safe non-contact power transmission system can be implemented by utilizing the above power transmitting device.

(10) According to another embodiment of the invention, there is provided a power transmitting device comprising:

the power transmission control devices as defined in the above (3) or (4);

the power transmitting section that includes the first power transmitting driver and the second power transmitting driver that drive the primary coil, the first test driver that drives the first node of the primary coil, and the second test driver that drives the second node of the primary coil; and the waveform monitor circuit that includes the switch circuit.

A reliable and safe non-contact power transmission system can be implemented by utilizing the above power transmitting device.

(11) According to another embodiment of the invention, there is provided an electronic instrument comprising the power transmitting device as defined in the above (9).

This implements a safe electronic instrument that allows non-contact power transmission (e.g., a charger (cradle) having a function of charging a secondary battery of a portable terminal via non-contact power transmission).

(12) According to another embodiment of the invention, there is provided an electronic instrument comprising the power transmitting device as defined in the above (10).

This implements a safe electronic instrument that allows non-contact power transmission (e.g., a charger (cradle) having a function of charging a secondary battery of a portable terminal via non-contact power transmission).

According to several embodiments of the invention, a non-contact power transmission system in which a failure can be detected stably and reliably while taking the operation of another circuit connected to a primary coil into consideration can thus be implemented.

(13) According to another embodiment of the invention, there is provided a waveform monitor circuit provided in a power transmitting device of a non-contact power transmission system, the non-contact power transmission system transmitting power from the power transmitting device to a power receiving device by electromagnetically coupling a primary coil and a secondary coil, the waveform monitor circuit monitoring at least one of a voltage and a current of the primary coil, the waveform monitor circuit comprising:

a resistor that has one end and the other end, the one end being electrically connected to the primary coil; and a switch circuit provided in a signal path situated between the other end of the resistor and a low-level power supply potential.

A current that flows from the primary coil to the low-level power supply potential through the waveform monitor circuit can be cut completely by causing the switch circuit provided in the waveform monitor circuit to be turned OFF. For example, a situation in which an unnecessary current leaks into the low-level power supply potential through the waveform monitor circuit when increasing the voltage of one end of the primary coil can be prevented by causing the switch circuit to be turned OFF when detecting an initial failure of the power transmitting driver that drives the primary coil. As a result, an initial failure of the power transmitting driver can be detected accurately.

When a problem occurs due to a direct current that flows through the resistor of the waveform monitor circuit, such a problem can be prevented by causing the switch circuit to be turned OFF at an appropriate timing. This improves the reliability of the non-contact power transmission system, for example.

Preferred embodiments of the invention are described below with reference to the drawings. Note that the following embodiments do not in any way limit the scope of the invention defined by the claims laid out herein. Note that all elements of the following embodiments should not necessarily be taken as essential requirements for the invention.

FIRST EMBODIMENT

Examples of an electronic instrument to which the invention is suitably applied and the principle of non-contact power transmission technology are described below.

Figure 1B:
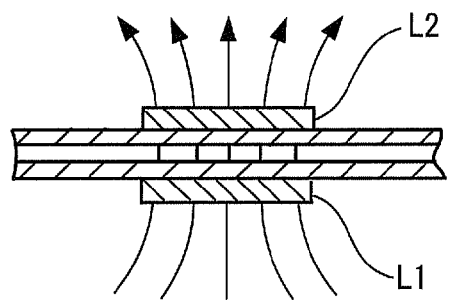

Examples of Electronic Instrument and Principle of Non-contact Power Transmission FIGS. 1A and 1B are views illustrative of examples of an electronic instrument to which the non-contact power transmission technology is applied, and the principle of non-contact power transmission using an induction transformer.

As shown in FIG. 1A, a charger (cradle) 500 (i.e., power-transmitting-side electronic instrument) includes a power transmitting device (e.g., power transmitting module including a power-transmitting-side control circuit (power-transmitting-side control IC)) 10.

A portable telephone 510 (i.e., power-receiving-side instrument) includes a power receiving device (e.g., power receiving module including a power-receiving-side control circuit (power-receiving-side control IC)) 40. The portable telephone 510 also includes a display section 512 (e.g., LCD), an operation section 514 that includes a button or the like, a microphone 516 (sound input section), a speaker 518 (sound output section), and an antenna 520.

Power is supplied to the charger 500 through an AC adaptor 502. The power supplied to the charger 500 is transmitted from the power transmitting device 10 to the power receiving device 40 by means of non-contact power transmission. This makes it possible to charge a battery of the portable telephone 510 or operate a device provided in the portable telephone 510.

As schematically shown in FIG. 1B, power transmission from the power transmitting device 10 to the power receiving device 40 is implemented by electromagnetically coupling a primary coil L1 (power-transmitting-side coil) provided in the power transmitting device 10 and a secondary coil L2 (power-receiving-side coil) provided in the power receiving device 40 to form a power transmission transformer. This enables non-contact power transmission.

Note that the electronic instrument to which this embodiment is applied is not limited to the portable telephone 510. For example, this embodiment may be applied to various other electronic instruments such as a wristwatch, a cordless telephone, a shaver, an electric toothbrush, a wrist computer, a handy terminal, a portable information terminal, and a power-assisted bicycle.

Examples of particularly suitable electronic instruments include a portable terminal (including a portable telephone terminal, PDA terminal, and portable personal computer terminal) and a watch. Since the power receiving device according to the invention has a simple configuration and a reduced size, the power receiving device can be incorporated in a portable terminal or the like. The charging time of a secondary battery provided in an electronic instrument can be reduced using the power receiving device according to the invention due to low loss. Moreover, since the power receiving device according to the invention reduces heat generation, the reliability of an electronic instrument is improved from the viewpoint of safety.

In particular, since a large amount of charging current flows through a portable terminal (including a portable telephone terminal, PDA terminal, and portable personal computer terminal) under heavy load, heat may be generated to a large extent. Therefore, the features of the invention (i.e., low loss and low heat generation) can be sufficiently utilized for such a portable terminal.

Configuration Examples of Power Transmitting Device and Power Receiving Device

Figure 2:
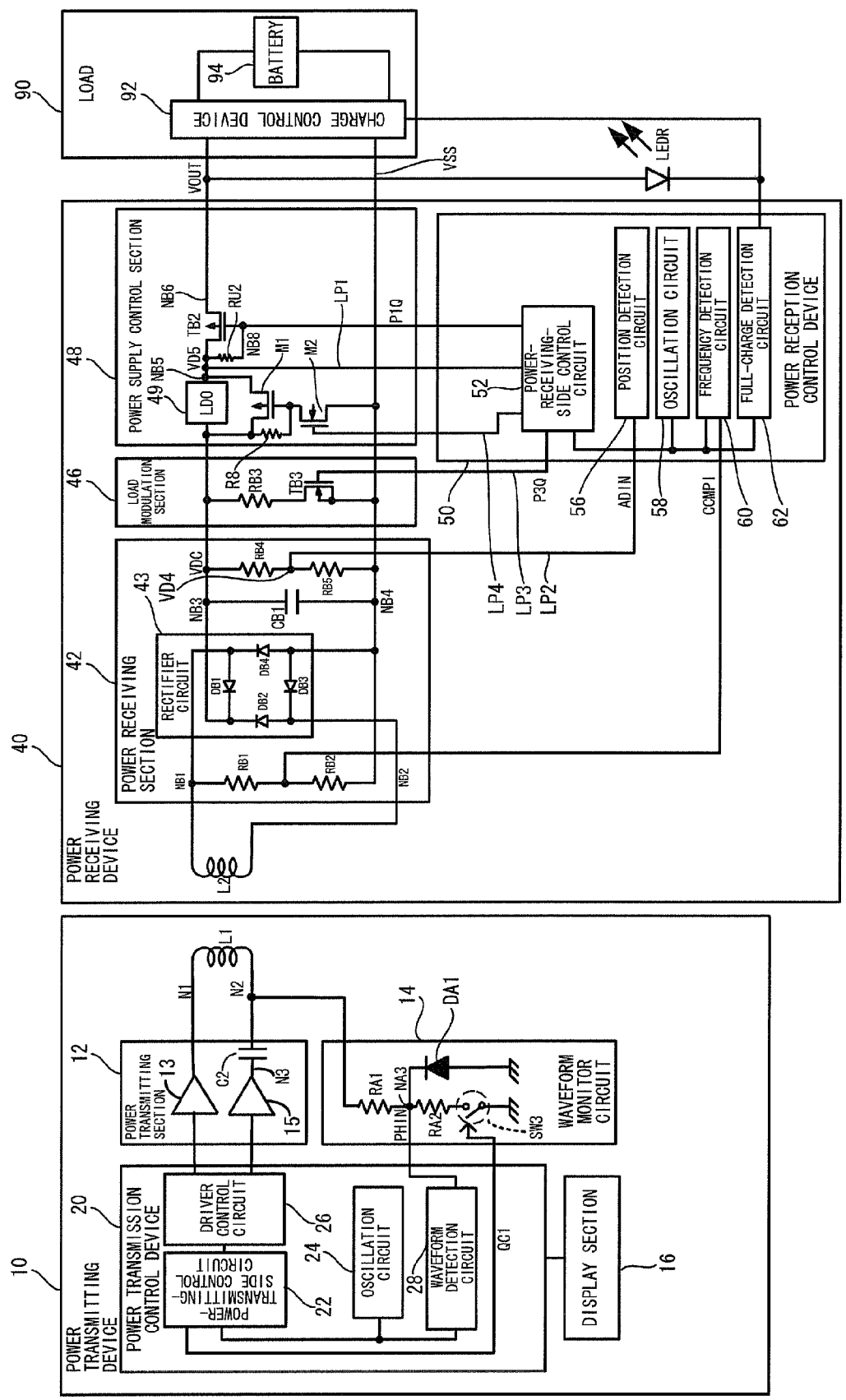
FIG. 2 is a view showing an example of a specific configuration of a power transmitting device, a power transmission control device, a power receiving device, and a power reception control device according to the invention.

FIG. 2 is a circuit diagram showing an example of a specific configuration of each section of a non-contact power transmission system that includes a power transmitting device and a power receiving device. As shown in FIG. 2, the power transmitting device 10 includes a power transmission control device 20, a power transmitting section 12, and a waveform monitor circuit 14. The power transmission control device 20 includes a power-transmitting-side control circuit 22, an oscillation circuit 24, a driver control circuit 26, and a waveform detection circuit 28.

The power receiving device 40 includes a power receiving section 42, a load modulation section 46, and a power supply control section 48. A load 90 includes a charge control device 92 and a battery (secondary battery) 94. The details are given below. A power-transmitting-side electronic instrument such as the charger 500 includes at least the power transmitting device 10 shown in FIG. 2. A power-receiving-side electronic instrument such as the portable telephone 510 includes at least the power receiving device 40 and the load 90. The configuration shown in FIG. 2 implements a non-contact power transmission (contactless power transmission) system that transmits power from the power transmitting device 10 to the power receiving device 40 by electromagnetically coupling the primary coil L1 and the secondary coil L2 to supply power (voltage VOUT) to the load 90 from a voltage output node NB6 of the power receiving device 40.

The power transmitting device 10 (power transmitting module or primary module) may include the primary coil L1, the power transmitting section 12, the waveform monitor circuit 14, a display section 16, and the power transmission control device 20. The power transmitting section 12 includes a first power transmitting driver 13 and a second power transmitting driver 15.

The first power transmitting driver 13 drives one end (first node N1) of the primary coil L1 without utilizing a capacitor. The second power transmitting driver 15 drives the other end (second node N2) of the primary coil L1 through a series-resonance capacitor C2. The primary coil L1 and the capacitor C2 form a series-resonant circuit. The power transmitting section 12 includes at least one test driver (not shown in FIG. 2) used to detect an initial failure of the first and second power transmitting drivers (13 and 15). When detecting an initial failure of the first power transmitting driver 13, the test driver (not shown in FIG. 2) drives the first node N1. When detecting an initial failure of the second power transmitting driver 13, the test driver (not shown in FIG. 2) drives a third node N3 that is a common connection node of an output node (output terminal) of the second power transmitting driver 15 and one electrode of the capacitor C2. The third node N3 is DC-separated from the waveform monitor circuit 14 by the capacitor C2. The first node N1 is DC-connected to the waveform monitor circuit 14 since a capacitor is not provided.

In the waveform monitor circuit 14, a switch circuit SW3 is provided in a signal path between the primary coil L1 and a low-level power supply potential (ground). Specifically, when measuring the voltage of the node N1, a measurement error occurs if a direct current flows through the waveform monitor circuit 14, for example. Therefore, the switch circuit is provided in the waveform monitor circuit 14 in the signal path that connects the primary coil and the ground potential in order to prevent such a situation. The switch circuit SW3 is ON/OFF-controlled based on a switch control signal QC1 output from the power-transmitting-side control circuit 22. The ON/OFF-control operation of the switch circuit SW3 is described later.

Note that the power transmitting device 10 and the power transmission control device 20 are not limited to the configuration shown in FIG. 2. Various modifications may be made such as omitting some (e.g., display section) of the elements, adding other elements, or changing the connection relationship. The power transmitting section 12 generates an alternating-current voltage having a given frequency during power transmission, and generates an alternating-current voltage having a frequency that differs depending on data during data transfer. The power transmitting section 12 supplies the alternating-current voltage to the primary coil L1.

Figure 3A:
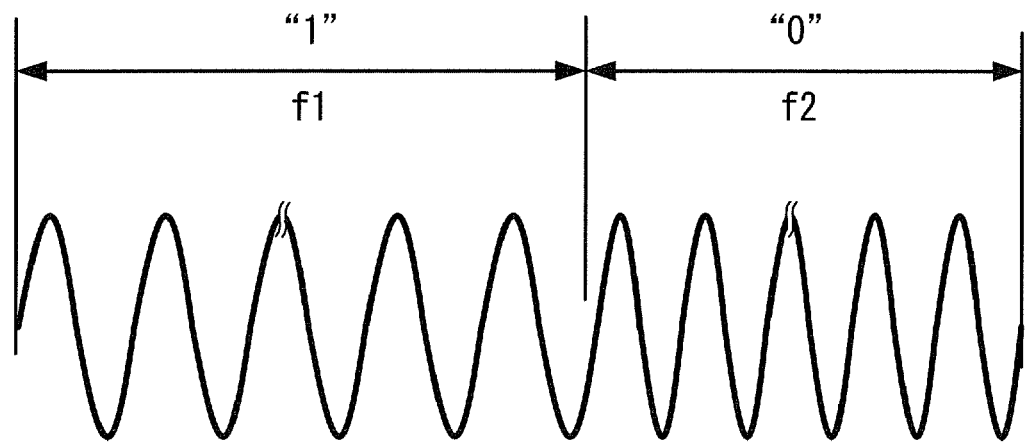
FIGS. 3A and 3B are views illustrative of the principle of information transmission between a power-transmitting-side instrument and a power-receiving-side instrument.
Figure 3B:
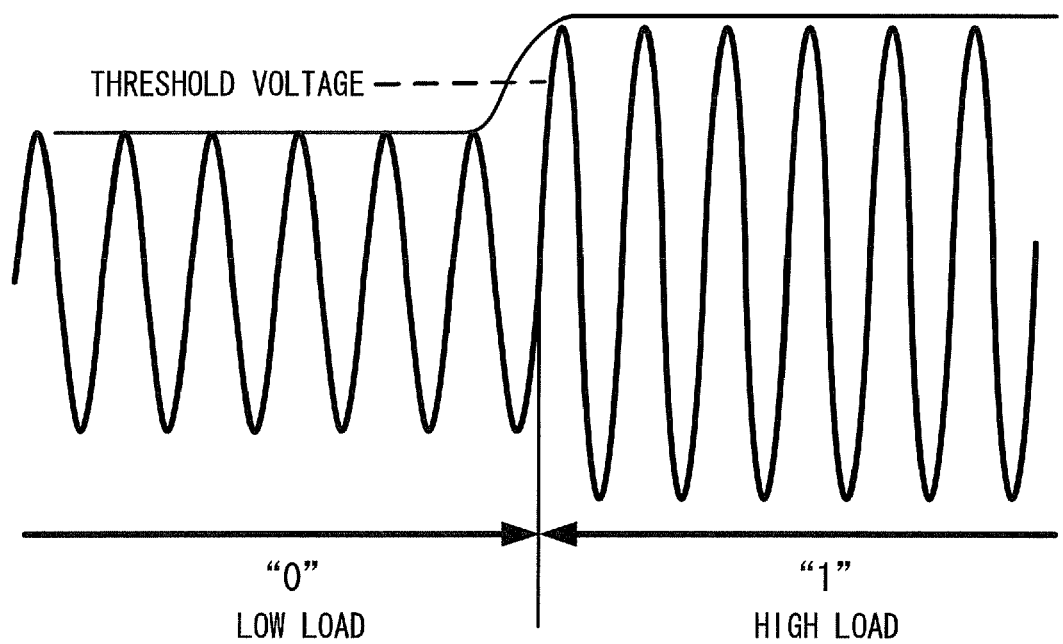

FIGS. 3A and 3B are views illustrative of an example of the principle of information transmission between the power-transmitting-side instrument and the power-receiving-side instrument. Information is transmitted from the primary-side instrument to the secondary-side instrument utilizing frequency modulation. Information is transmitted from the secondary-side instrument to the primary-side instrument utilizing load modulation. As shown in FIG. 3A, the power transmitting device 10 generates an alternating-current voltage having a frequency f1 when transmitting data "1" to the power receiving device 40, and generates an alternating-current voltage having a frequency f2 when transmitting data "0" to the power receiving device 40, for example. As shown in FIG. 3B, the power receiving device 40 can switch the load state between a low-load state and a high-load state by load modulation to transmit data "0" or "1" to the primary-side instrument (power transmitting device 10).

Again referring to FIG. 2, the power transmitting section 12 may include the first power transmitting driver that drives one end of the primary coil L1, the second power transmitting driver that drives the other end of the primary coil L1, and at least one capacitor that forms a resonant circuit with the primary coil L1. Each of the first and second power transmitting drivers included in the power transmitting section 12 is an inverter circuit (or buffer circuit) that includes a power MOS transistor, for example, and is controlled by the driver control circuit 26 of the power transmission control device 20.

The primary coil L1 (power-transmitting-side coil) is electromagnetically coupled to the secondary coil L2 (power-receiving-side coil) to form a power transmission transformer. For example, when power transmission is necessary, the portable telephone 510 is placed on the charger 500 so that a magnetic flux of the primary coil L1 passes through the secondary coil L2, as shown in FIG. 1. When power transmission is unnecessary, the charger 500 and the portable telephone 510 are physically separated so that a magnetic flux of the primary coil L1 does not pass through the secondary coil L2.

The waveform monitor circuit 14 is a circuit that detects an induced voltage in the primary coil L1. The waveform monitor circuit 14 includes resistors RA1 and RA2, and a diode DA1 provided between a connection node NA3 of the resistors RA1 and RA2 and a power supply GND (low-potential-side power supply in a broad sense), for example. Specifically, a signal PHIN obtained by dividing the induced voltage in the primary coil L1 using the resistors RA1 and RA2 is input to the waveform detection circuit 28 of the power transmission control device 20. The waveform monitor circuit 14 is an external circuit, for example.

The display section 16 displays the state (e.g., power transmission or ID authentication) of the non-contact power transmission system using a color, an image, or the like. The display section 16 is implemented by a light-emitting diode (LED), a liquid crystal display (LCD), or the like.

The power transmission control device 20 controls the power transmitting device 10. The power transmission control device 20 may be implemented by an integrated circuit device (IC) or the like. The power transmission control device 20 includes the power-transmitting-side control circuit 22, the oscillation circuit 24, the driver control circuit 26, and the waveform detection circuit 28.

The power-transmitting-side control circuit 22 controls the power transmitting device 10 and the power transmission control device 20. The power-transmitting-side control circuit 22 may be implemented by a gate array, a microcomputer, or the like.

Specifically, the power-transmitting-side control circuit 22 performs sequence control and a determination process necessary for power transmission, load detection, frequency modulation, foreign object detection, removal (detachment) detection, and the like.

The oscillation circuit 24 is formed by a crystal oscillation circuit or the like, and generates a primary-side clock signal. The driver control circuit 26 generates a control signal at a desired frequency based on the clock signal generated by the oscillation circuit 24, a frequency setting signal output from the control circuit 22, and the like, and outputs the generated control signal to the power transmitting drivers (not shown) of the power transmitting section 12 to control the operations of the power transmitting drivers.

The waveform detection circuit 28 monitors the waveform of the signal PHIN that corresponds to an induced voltage at one end of the primary coil L1, and performs load detection, foreign object detection, and the like. For example, when the load modulation section 46 of the power receiving device 40 has performed load modulation for transmitting data to the power transmitting device 10, the signal waveform of the induced voltage in the primary coil L1 changes correspondingly.

As shown in FIG. 3B, the amplitude (peak voltage) of the signal waveform decreases when the load modulation section 46 of the power receiving device 40 reduces the load in order to transmit data "0", and increases when the load modulation section 46 increases the load in order to transmit data "1", for example. Therefore, the waveform detection circuit 28 can determine whether the data transmitted from the power receiving device 40 is "0" or "1" by determining whether or not the peak voltage has exceeded a threshold voltage by performing a peak-hold process on the signal waveform of the induced voltage, for example. Note that the waveform detection method is not limited to the above-described method. For example, the waveform detection circuit 28 may determine whether the power-receiving-side load has increased or decreased utilizing a physical quantity other than the peak voltage.

The power receiving device 40 (power receiving module or secondary module) may include the secondary coil L2, the power receiving section 42, the load modulation section 46, the power supply control section 48, and a power reception control device 50. Note that the power receiving device 40 and the power reception control device 50 are not limited to the configuration shown in FIG. 2. Various modifications may be made such as omitting some of the elements, adding other elements, or changing the connection relationship.

The power receiving section 42 converts an alternating-current induced voltage in the secondary coil L2 into a direct-current voltage. A rectifier circuit 43 included in the power receiving section 42 converts the alternating-current induced voltage. The rectifier circuit 43 includes diodes DB1 to DB4. The diode DB1 is provided between a node NB1 at one end of the secondary coil L2 and a node NB3 (direct-current voltage VDC generation node). The diode DB2 is provided between the node NB3 and a node NB2 at the other end of the secondary coil L2. The diode DB3 is provided between the node NB2 and a node NB4 (VSS). The diode DB4 is provided between the nodes NB4 and NB1.

Resistors RB1 and RB2 of the power receiving section 42 are provided between the nodes NB1 and NB4. A signal CCMPI obtained by dividing the voltage between the nodes NB1 and NB4 using the resistors RB1 and RB2 is input to a frequency detection circuit 60 of the power reception control device 50.

A capacitor CB1 and resistors RB4 and RB5 of the power receiving section 42 are provided between the node NB3 (direct-current voltage VDC) and the node NB4 (VSS). A divided voltage D4 obtained by dividing the voltage between the nodes NB3 and NB4 using the resistors RB4 and RB5 is input to a power-receiving-side control circuit 52 and a position detection circuit 56 through a signal line LP2. The divided voltage VD4 is input to the position detection circuit 56 as a position detection signal input (ADIN).

The load modulation section 46 performs a load modulation process. Specifically, when the power receiving device 40 transmits the desired data to the power transmitting device 10, the load modulation section 46 variably changes the load of the load modulation section 46 (secondary side) corresponding to the transmission target data to change the signal waveform of the induced voltage in the primary coil L1. The load modulation section 46 includes a resistor RB3 and a transistor TB3 (N-type CMOS transistor) provided in series between the nodes NB3 and NB4.

The transistor TB3 is ON/OFF-controlled based on a control signal P3Q supplied from the power-receiving-side control circuit 52 of the power reception control device 50 through a signal line LP3. When performing the load modulation process by ON/OFF-controlling the transistor TB3 and transmitting a signal to the power transmitting device in an authentication stage before normal power transmission starts, a transistor TB2 of the power supply control section 48 is turned OFF so that the load 90 is not electrically connected to the power receiving device 40.

For example, when reducing the secondary-side load (high impedance) in order to transmit data "0", the signal P3Q is set at the L level so that the transistor TB3 is turned OFF. As a result, the load of the load modulation section 46 becomes almost infinite (no load). On the other hand, when increasing the secondary-side load (low impedance) in order to transmit data "1", the signal P3Q is set at the H level so that the transistor TB3 is turned ON. As a result, the load of the load modulation section 46 is equivalent to the resistor RB3 (high load).

The power supply control section 48 controls power supply to the load 90. A regulator (LDO) 49 regulates the voltage level of the direct-current voltage VDC obtained by conversion by the rectifier circuit 43 to generate a power supply voltage VD5 (e.g., 5 V). The power reception control device 50 operates based on the power supply voltage VD5 supplied from the power supply control section 48, for example.

A switch circuit formed using a PMOS transistor (M1) is provided between the input terminal and the output terminal of the regulator (LDO) 49. A path that bypasses the regulator (LDO) 49 is formed by causing the PMOS transistor (M1) (switch circuit) to be turned ON. For example, since a power loss increases due to the equivalent impedance of the regulator 49 and heat generation increases under heavy load (e.g., when it is necessary to cause an almost constant large current to steadily flow in the initial stage of charging a secondary battery exhausted to a large extent), a current is supplied to the load through a path that bypasses the regulator.

An NMOS transistor (M2) and a pull-up resistor R8 that function as a bypass control circuit are provided to ON/OFF-control the PMOS transistor (M1) (switch circuit).

The NMOS transistor (M2) is turned ON when a high-level control signal is supplied to the gate of the NMOS transistor (M2) through a signal line LP4. This causes the gate of the PMOS transistor (M1) to be set at a low level so that the PMOS transistor (M1) is turned ON. As a result, a path that bypasses the regulator (LDO) 49 is formed. When the NMOS transistor (M2) is turned OFF, the gate of the PMOS transistor (M1) is maintained at a high level through the pull-up resistor R8. Therefore, the PMOS transistor (M1) is turned OFF so that the bypass path is not formed.

The NMOS transistor (M2) is ON/OFF-controlled by the power-receiving-side control circuit 52 included in the power reception control device 50.

The transistor TB2 (P-type CMOS transistor) is provided between a power supply voltage (VD5) generation node NB5 (output node of the regulator 49) and the node NB6 (voltage output node of the power receiving device 40), and is controlled based on a signal P1Q output from the power-receiving-side control circuit 52 of the power reception control device 50. Specifically, the transistor TB2 is turned ON when normal power transmission is performed after completion (establishment) of ID authentication.

A pull-up resistor RU2 is provided between the power supply voltage generation node NB5 and a node NB8 of the gate of the transistor TB2.

The power reception control device 50 controls the power receiving device 40. The power reception control device 50 may be implemented by an integrated circuit device (IC) or the like. The power reception control device 50 may operate based on the power supply voltage VD5 generated based on the induced voltage in the secondary coil L2. The power reception control device 50 may include the (power-receiving-side) control circuit 52, the position detection circuit 56, an oscillation circuit 58, the frequency detection circuit 60, and a full-charge detection circuit 62.

The power-receiving-side control circuit 52 controls the power receiving device 40 and the power reception control device 50. The power-receiving-side control circuit 52 may be implemented by a gate array, a microcomputer, or the like. The power-receiving-side control circuit 52 operates based on a constant voltage (VD5) at the output terminal of the series regulator (LDO) 49 as a power supply voltage. The power supply voltage (VD5) is supplied to the power-receiving-side control circuit 52 through a power supply line LP1.

The power-receiving-side control circuit 52 performs sequence control and a determination process necessary for ID authentication, position detection, frequency detection, full-charge detection, load modulation for authentication communication, load modulation for communication that enables detection of foreign object insertion, and the like.

The position detection circuit 56 monitors the waveform of the signal ADIN that corresponds to the waveform of the induced voltage in the secondary coil L2, and determines whether or not the positional relationship between the primary coil L1 and the secondary coil L2 is appropriate.

Specifically, the position detection circuit 56 converts the signal ADIN into a binary value using a comparator, and determines whether or not the positional relationship between the primary coil L1 and the secondary coil L2 is appropriate.

The oscillation circuit 58 includes a CR oscillation circuit or the like, and generates a secondary-side clock signal. The frequency detection circuit 60 detects the frequency (f1 or f2) of the signal CCMPI, and determines whether the data transmitted from the power transmitting device 10 is "1" or "0".

The full-charge detection circuit 62 (charge detection circuit) detects whether or not the battery 94 of the load 90 has been fully charged (charge state). Specifically, the full-charge detection circuit 62 detects the full-charge state by detecting whether a light-emitting device (LEDR) used to indicate the charge state is turned ON or OFF, for example. The full-charge detection circuit 62 determines that the battery 94 has been fully charged (charging has been completed) when the light-emitting device (LEDR) has been turned OFF for a given period of time (e.g., five seconds).

Figure 4:
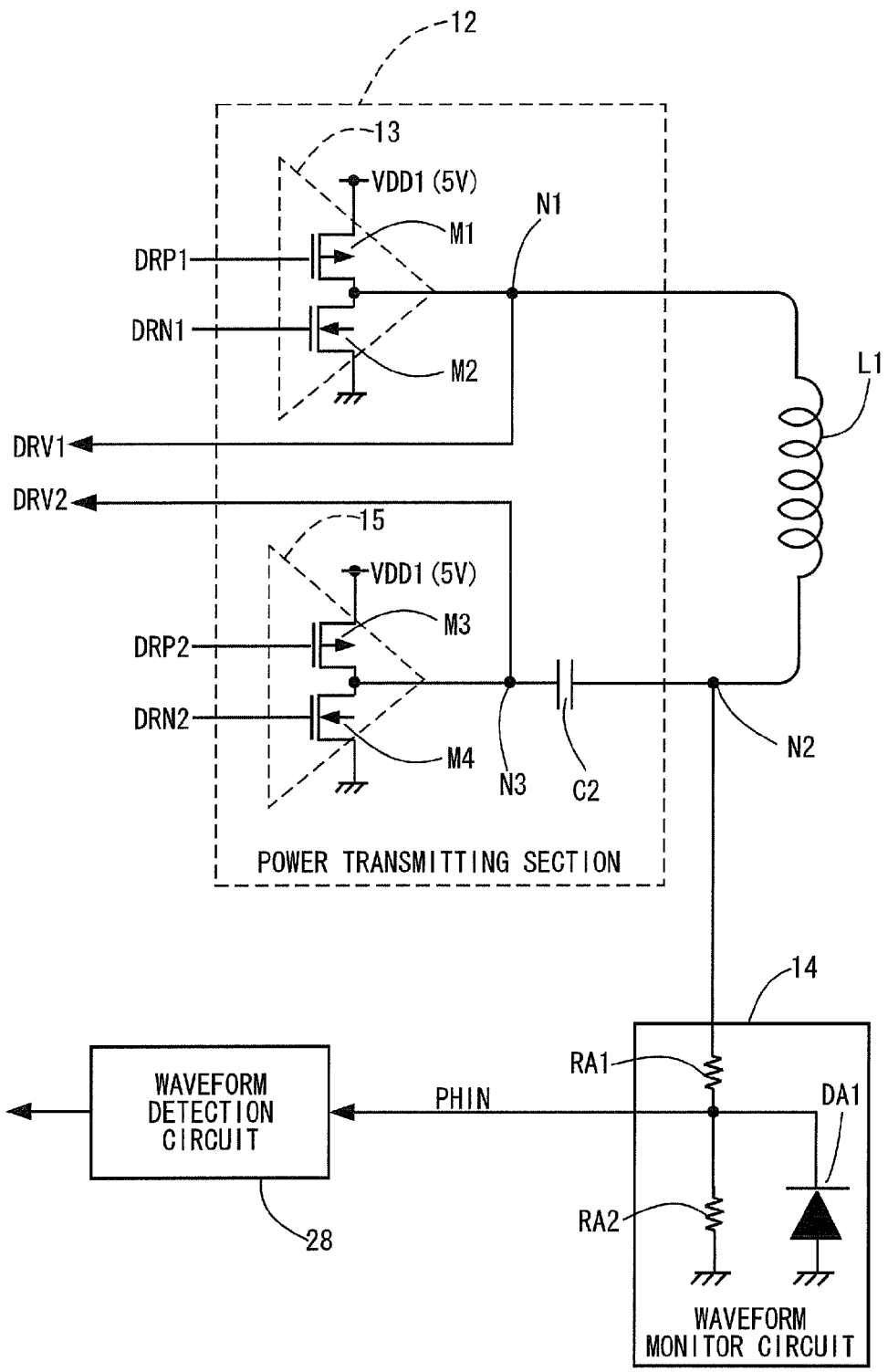
FIG. 4 is a circuit diagram illustrative of a specific circuit configuration of a power transmitting section and coil-end voltage monitoring.

Specific circuit configuration of power transmitting section and monitoring of coil-end voltage FIG. 4 is a circuit diagram illustrative of a specific circuit configuration of the power transmitting section and coil-end voltage monitoring.

As shown in FIG. 4, the power transmitting driver 13 provided in the power transmitting section 12 of the power transmitting device 10 drives the coil end N1 (upper end) of the primary coil L1. The power transmitting driver 13 is a CMOS buffer that includes a PMOS transistor M1 and an NMOS transistor M2 connected in series between the power supply voltage (VDD1: 5 V, for example) and ground. The gate of each transistor is controlled based on an individual gate drive signal (DRP1 or DRN1).

The drive output of the CMOS buffer is set at the H level when the PMOS transistor M1 is turned ON. The drive output of the CMOS buffer is set at the L level when the NMOS transistor M2 is turned ON. The output terminal of the CMOS buffer is set in a floating state (indefinite potential state) when the PMOS transistor M1 and the NMOS transistor M2 are turned OFF. The floating state may be considered to be a high impedance state. Therefore, the power transmitting driver 13 is a tri-state buffer.

The power transmitting driver 15 drives the coil end N2 (lower end) of the primary coil L1. The power transmitting driver 15 is a CMOS buffer that includes a PMOS transistor M3 and an NMOS transistor M4 connected in series between the power supply voltage (VDD1: 5 V, for example) and ground. The gate of each transistor is controlled based on an individual gate drive signal (DRP2 or DRN2). The power transmitting driver 15 is a tri-state buffer of which the potential of the output terminal can be set in three states (i.e., H level, L level, and floating state).

The primary coil L1 and the capacitor C2 forms a series-resonant circuit. One electrode of the capacitor C2 is connected to the second node N2, and the other electrode of the capacitor C2 is connected to the third node N3. A capacitor is not connected to the first node N1. It suffices to provide one capacitor in order to form a series-resonant circuit. If the capacitor C2 has a sufficient breakdown voltage, it is unnecessary to provide another capacitor connected to the node N1. When providing only one capacitor, a loss in the capacitor is reduced as compared with the case of providing a plurality of capacitors. Moreover, since the number of parts can be reduced, cost and the mounting area can be reduced.

When the resonance frequency of the above-described series-resonant circuit is referred to as f0, the frequencies f1 and f2 used to transmit data "1" or "0" to the secondary-side instrument are set at values higher than the resonance frequency f0, for example.

In this embodiment, the voltages of the nodes N1 and N3 of the primary coil L1 are monitored in order to detect an initial failure of the power transmitting drivers (13 and 15), for example. The nodes N1 and N3 also serve as the output terminals of the power transmitting drivers (13 and 15). The power-transmitting-side control circuit 22 (i.e., a failure detection circuit (not shown in FIG. 4: reference numeral 34 in FIG. 10) provided in the power-transmitting-side control circuit 22) determines the presence or absence of an initial failure of the power transmitting drivers (13 and 15) based on voltages DRV1 and DRV2 (i.e., coil-end voltages) of the nodes N1 and N3 of the primary coil L1. An initial failure of the power transmitting driver is detected after power has been supplied, but before power transmission starts, for example.

The initial failure detection principle is as follows. Specifically, the outputs of the power transmitting drivers 13 and 15 are set in a high impedance state, and the H-level or L-level drive output from the test driver (not shown in FIG. 4) is applied to the nodes N1 and N3. If the transistors (M1 to M4) that form the power transmitting drivers 13 and 15 are normal, the voltages of the nodes N1 and N3 coincide with the output level of the test driver. If the transistors (M1 to M4) that form the power transmitting drivers 13 and 15 have broken down, the voltages of the nodes N1 and N3 change due to a leakage current of the transistors that have broken down and do not coincide with the output level of the test driver. Therefore, a failure of the power transmitting driver can be detected.

The following description focuses on the node N1. Since a capacitor is not connected (provided) to the node N1, the node N1 is DC-connected to the primary coil L1 and the waveform monitor circuit 14. Therefore, when the resistance of the waveform monitor circuit (RA1 and RA2) is low, for example, a direct current flows toward ground through the primary coil L1 and the waveform monitor circuit 14 when setting the voltage of the node N1 at the H level using the test driver (not shown in FIG. 4). As a result, it may be impossible to increase the voltage of the node N1 to a voltage level that can be considered to be the H level.

The power transmitting driver 13 cannot be inspected accurately when such a phenomenon occurs. Therefore, it is necessary to reliably increase the voltage of the node N1 to a voltage level that can be considered to be the H level. Since the node N3 is DC-isolated by the capacitor C2, a direct current does not flow toward ground through the primary coil L1 and the waveform monitor circuit 14 even if the voltage of the node N3 increases. Therefore, the above-described problem does not occur.

Specific operation that detects initial failure of power transmitting driver

An operation that detects an initial failure of the power transmitting driver is described in detail below. The principle of detecting an initial failure of the power transmitting driver has been described above. However, it is necessary to take measures in terms of circuits so that the voltage of the node N1 increases reliably.

Figure 5A:
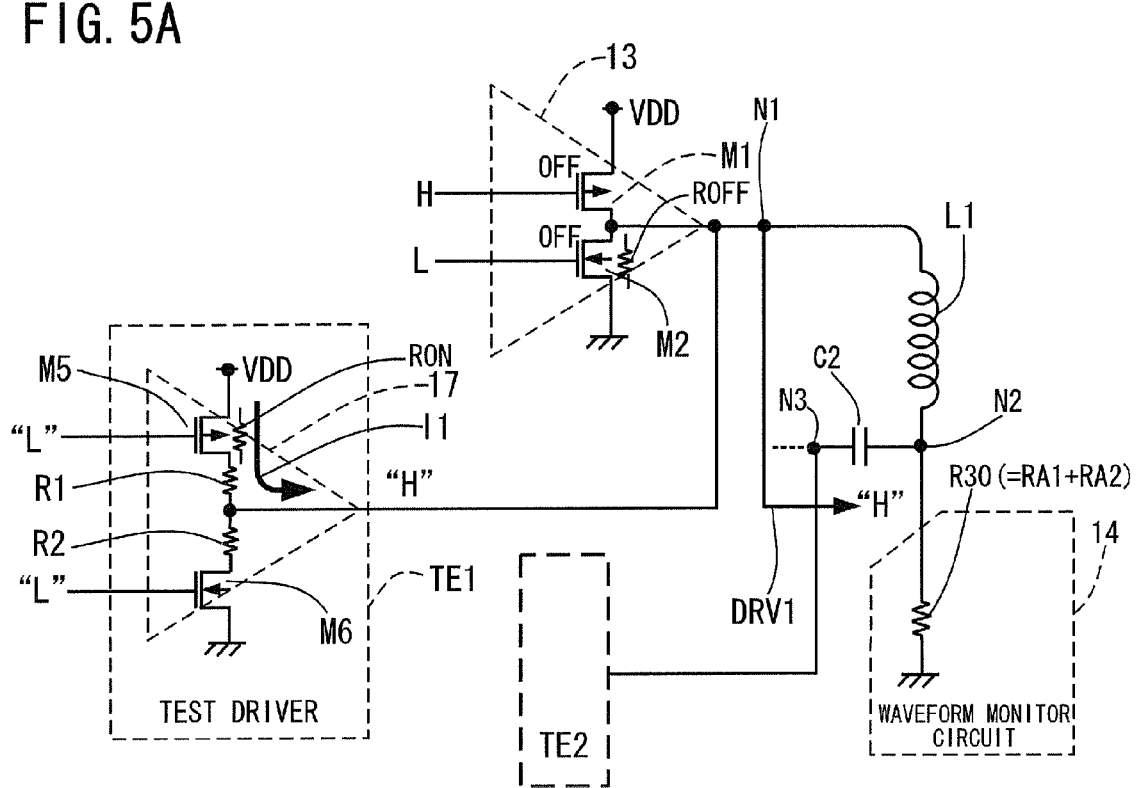
FIGS. 5A and 5B are views illustrative of a specific operation that detects an initial failure of a power transmitting driver.
Figure 5B:
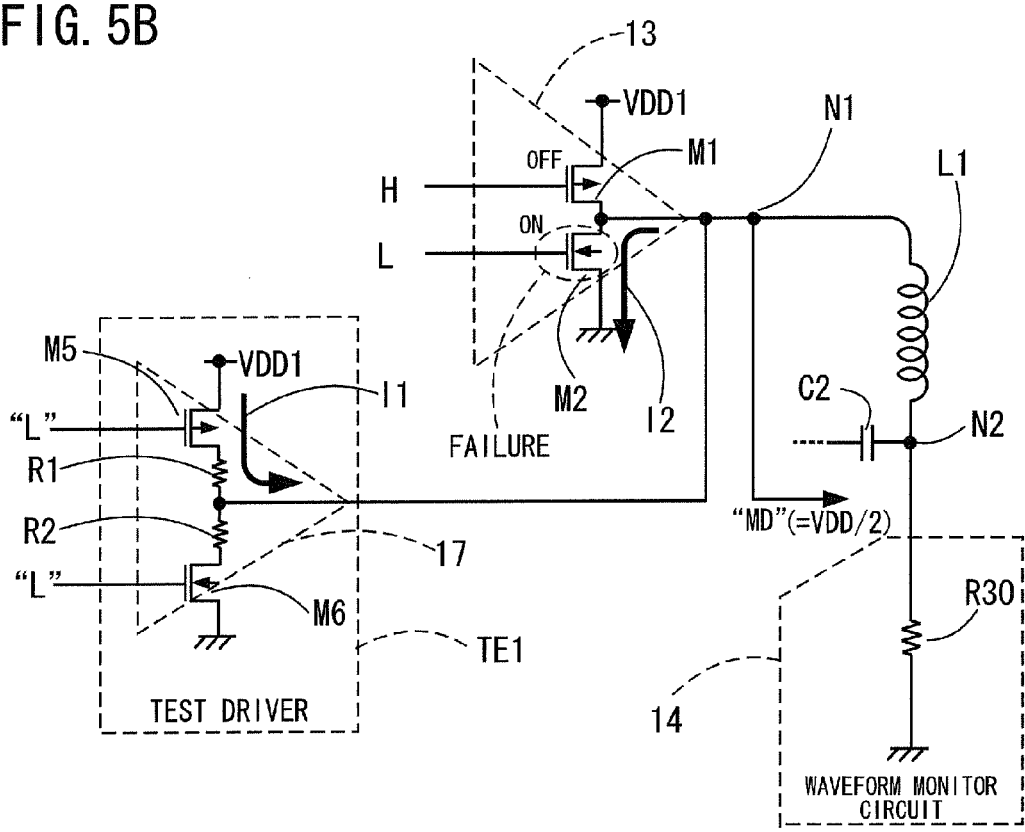

FIGS. 5A and 5B are views illustrative of a specific operation that detects an initial failure of the power transmitting driver. FIG. 5A shows the case where a failure does not occur, and FIG. 5B shows the case where a failure has occurred.

If a failure has occurred in the power transmitting drivers 13 and 15, it is desirable to detect the failure before the normal drive operation (normal power transmission) and repair the instrument without performing normal power transmission. In this embodiment, an initial failure is preferably detected before the normal drive operation.

In FIGS. 5A and 5B, a test driver TE1 is provided so that an initial failure of the power transmitting driver 13 can be detected. A test driver TE2 is similarly provided to detect an initial failure of the power transmitting driver 15 (the circuit configuration of the test driver TE2 is the same as that of the test driver TE1, and is omitted accordingly). As shown in FIGS. 5A and 5B, the test driver TE1 includes a PMOS transistor M5, an NMOS transistor M6, and current-limiting resistors R1 and R2 that are connected in series between power supplies.

The current-limiting resistors R1 and R2 are provided for the following reason. Specifically, when the current drive capability of the test driver TE1 (TE2) is too high, a leakage current may be masked when the amount of leakage current that flows through each transistor that forms the power transmitting drivers 13 and 15 in which an initial failure has occurred is small. As a result, the initial failure may not be detected. Therefore, a current that flows through the test driver is reduced to some extent using the current-limiting resistors (R1 and R2).

An initial failure detection process is described below. The input signals (DRP1 and DRN1) input to the transistors (M1 and M2) of the power transmitting driver 13 are respectively set at the H level and the L level so that the transistors (M1 and M2) are turned OFF. Therefore, the coil end (N1) of the primary coil is set in a floating state.

The test driver TE1 then drives the coil end (N1). Since the power transmitting driver 13 is incompetent and the voltage of the coil end (N1) is controlled by the test driver TE1, the voltage of the coil end (N1) should change corresponding to the drive voltage (output terminal voltage) of the test driver TE1.

As shown in FIG. 5A, when input signals (INTP1 and INTP2) input to the transistors M5 and M6 that form the test driver TE1 are set at the L level, the PMOS transistor M5 is turned ON so that the voltage of the output terminal of the test driver TE1 is set at the H level, for example. The voltage of the coil end (N1) increases to the H level due to a charging current I1 from the power supply VDD1. A normal circuit operation is thus performed when an initial failure does not occur in the power transmitting driver 13.

On the other hand, when the NMOS transistor M2 of the power transmitting driver 13 has broken down (see FIG. 5B), for example, the voltage of the coil end (N1) does not reach the H level (e.g., set at a voltage half of the power supply voltage) due to a leakage current I2 that flows through the NMOS transistor M2 of the power transmitting driver, even if the voltage of the output terminal of the test driver TE1 has been set at the H level.

Specifically, when an initial failure has occurred in the power transmitting driver 13, the coil-end voltage does not coincide with the drive voltage of the test driver TE1 due to a leakage current that flows through the transistor that has broken down. Therefore, the initial failure can be detected.

In the circuit shown in FIGS. 5A and 5B, the node N1 is directly DC-connected to the waveform monitor circuit 14. Specifically, a direct current may flow from the primary coil L1 through a resistor R30 (i.e., a combined resistor of the resistor RA1 and the resistor RA2 shown in FIG. 4) of the waveform monitor circuit. The direct current may cause an error so that an initial failure of the power transmitting driver 13 may not be detected accurately.

Figure 6A:
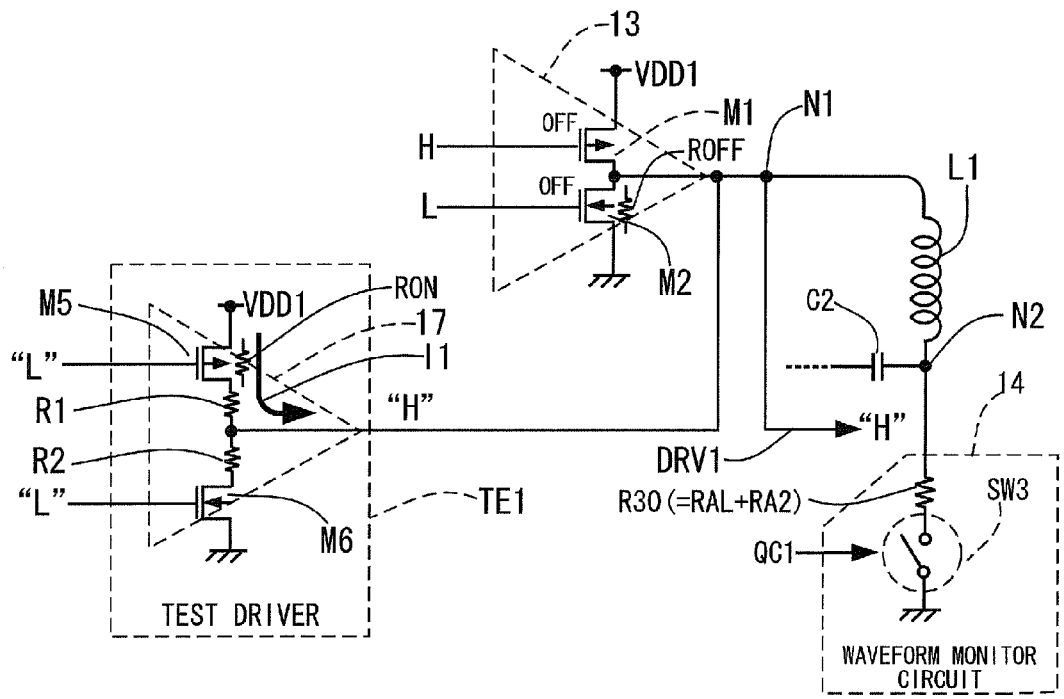
FIGS. 6A and 6B are views showing configuration examples of a power transmitting section that is configured so that the coil-end voltage can be detected accurately without being affected by a direct current.
Figure 6B:
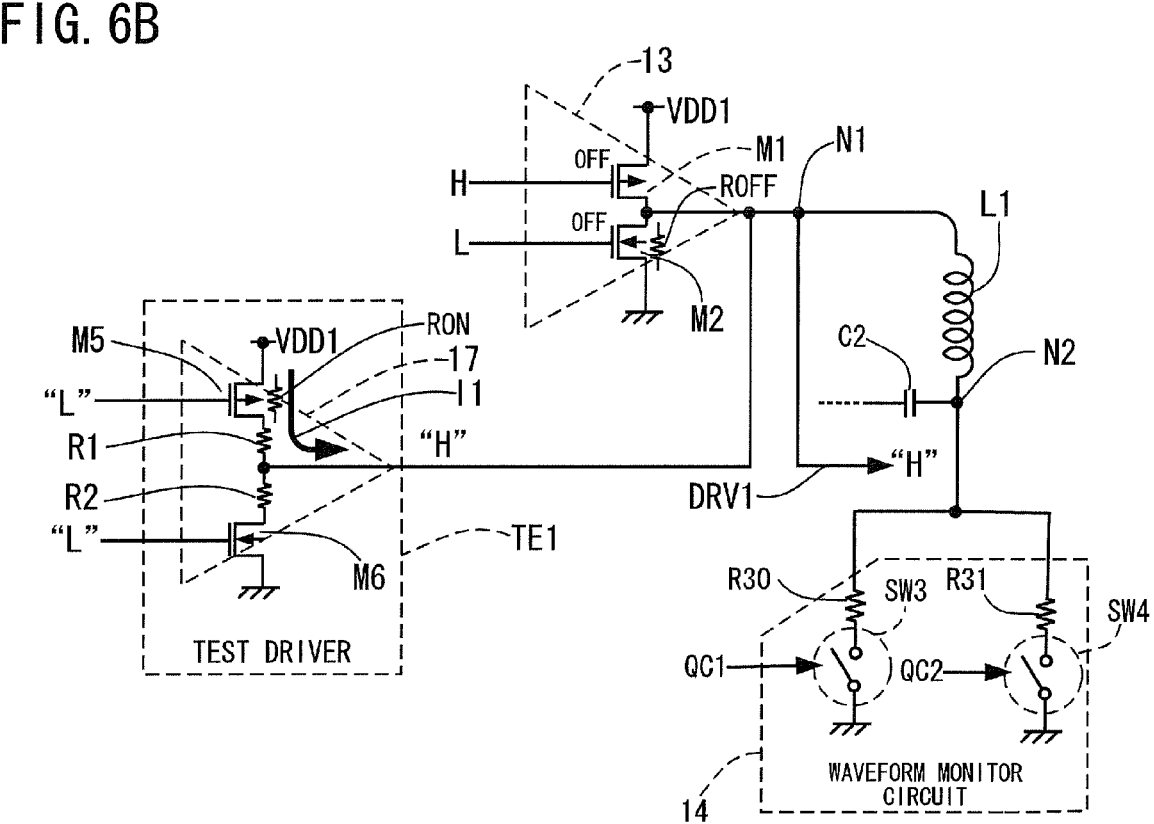

In this embodiment, a switch circuit is provided in the waveform monitor circuit 14 in order to deal with such a problem, as shown in FIGS. 6A and 6B. FIGS. 6A and 6B are views showing configuration examples of the power transmitting section that is configured so that the coil-end voltage can be detected accurately without being affected by a direct current.

In FIG. 6A, the switch SW3 provided in the waveform monitor circuit 14 is turned OFF during an initial failure diagnosis process. Therefore, a direct current does not flow from the node N1 to ground when an initial failure has occurred. The circuit parameter of each element is set so that the following expression (1) is satisfied.

$$\text{VDD} \cdot \{\text{ROFF}/(\text{RON}+\text{R1}+\text{ROFF})\} > \text{Vth}(H) \tag{1}$$

where, VDD is a high-level power supply voltage, ROFF is the resistance (off-resistance) when the NMOS transistor M2 that forms the first power transmitting driver 13 is turned OFF, R1 is the resistance of the current-limiting resistor R1 of the test driver TE1, RON is the resistance (on-resistance) when the PMOS transistor M5 that forms the test driver TE1 is turned ON, and Vth(H) is a threshold voltage used to determine whether or not the node N1 is set at the H level.

Therefore, when the output from the test driver TE1 is set at the H level during the initial failure diagnosis process, the voltage of the node N1 is necessarily set at the H level when a failure does not occur in the power transmitting driver 13. As a result, an initial failure of the first power transmitting driver 13 can be detected reliably.

A transistor switch (MOS transistor switch or bipolar transistor switch) may be used as the switch SW3, for example. A mechanical switch may also be used as the switch SW3. When the waveform monitor circuit 14 is an external circuit, the switch SW3 can be easily provided in the waveform monitor circuit 14.

A current that flows from the primary coil L1 into a low-level power supply potential (GND) through the resistor R30 provided in the waveform monitor circuit 14 can be completely blocked by thus causing the switch circuit SW3 connected in series with the resistor R30 in the signal path in the waveform monitor circuit 14 to be turned OFF. Therefore, a situation in which an unnecessary current leaks into the low-level power supply potential through the waveform monitor circuit when increasing the voltage of one end (node N1) of the primary coil L1 can be prevented by causing the switch circuit SW3 to be turned OFF when detecting an initial failure of the power transmitting driver 13 that drives the primary coil L1, for example.

Therefore, the voltage of the node N1 of the primary coil L1 reliably reaches a high level when a failure does not occur in the power transmitting driver 13. As a result, an initial failure of the power transmitting driver can be detected accurately. When a problem occurs due to a direct current that flows through the resistor R30 of the waveform monitor circuit 14, such a problem can be prevented by causing the switch circuit to be turned OFF at an appropriate timing. This improves the reliability of the non-contact power transmission system, for example.

Since the waveform monitor circuit 14 is a circuit that handles a high voltage, it is desirable that the waveform monitor circuit 14 be an external circuit (note that the waveform monitor circuit 14 may be an internal circuit). When the waveform monitor circuit 14 is an external circuit, the switch SW3 can be easily mounted on a substrate.

As shown in FIG. 6B, when a plurality of signal paths through which a direct current flows from the node N1 to ground are present in the waveform monitor circuit 14 in parallel, the switch circuits SW3 and SW4 are respectively provided in the corresponding signal paths. The circuits SW3 and SW4 are ON/OFF-controlled based on the switch control signals QC1 and QC2 output from the power-transmitting-side control circuit 22.

When an initial failure has been detected, the normal drive operation is disabled, and the initial failure is reported, for example. This makes it possible to promptly take appropriate measures, such as collecting and repairing the instrument, so that safety can be improved.

Failure Detection During Normal Power Transmission

If a failure of the CMOS driver can be detected during normal operation, the reliability and safety of the non-contact power transmission system are further improved. For example, when the NMOS transistor that forms the CMOS driver cannot be completely turned OFF due to a failure (i.e., a current always flows through the NMOS transistor), the normal PMOS transistor may break down due to a shoot-through current if normal power transmission is continuously performed without detecting the failure of the NMOS transistor. When both of the PMOS transistor and the NMOS transistor have broken down, a large amount of current may flow between the power supplies. As a result, heat may be generated or the instrument may break down. Therefore, when a failure has occurred during normal operation, it is desirable to promptly detect the failure and take appropriate measures.

FIGS. 7A to 7D are views illustrative of the principle of detecting a failure (normal failure) of the power transmitting driver during normal power transmission. An example of detecting a failure of the power transmitting driver 13 is described below (a failure of the power transmitting driver 15 is detected similarly).

Figure 7A:
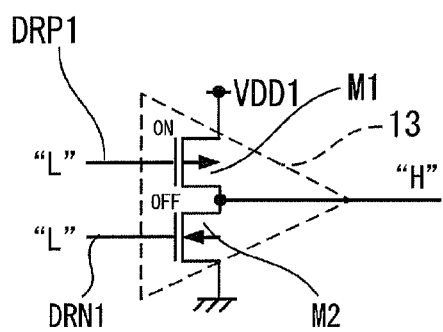
FIGS. 7A to 7D are views illustrative of the principle of detecting a failure (normal failure) of a power transmitting driver during normal power transmission.
Figure 7B:
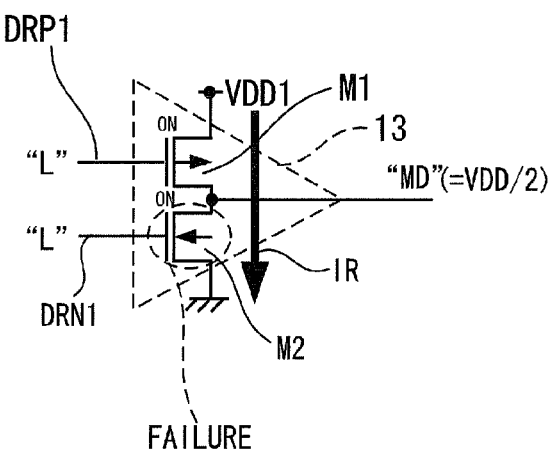

As shown in FIG. 7A, when the signals DRP1 and DRP2 are set at the L level, the PMOS transistor M1 is turned ON and the NMOS transistor M2 is turned OFF so that the potential of the output terminal is set at the H level when the power transmitting driver 13 is normal (without failure). As shown in FIG. 7B, when the NMOS transistor M2 undergoes a short-circuit failure, for example, the NMOS transistor M2 that should be turned OFF is substantially turned ON. Therefore, a large amount of shoot-through current IR occurs in a period in which the PMOS transistor M1 is turned ON. When the shoot-through current flows repeatedly, the normal PMOS transistor M1 also breaks down. In this case, a short circuit occurs between the power supplies.

Therefore, the potential of the output terminal of the power transmitting driver 13 (i.e., the coil end N1 of the primary coil) is monitored, and whether or not the potential corresponds to the voltage level of the input signal from the power transmitting driver 13 is detected to detect a failure.

Specifically, when the NMOS transistor M2 does not undergo a short-circuit failure, the voltage of the output terminal should be set at the H level when the signals DRP1 and DRP2 are set at the L level (see FIG. 7A). On the other hand, when the NMOS transistor M2 undergoes a short-circuit failure, the voltage of the output terminal is set at a voltage MD (e.g., a voltage half of the power supply voltage) other than the H level (see FIG. 7B). A short-circuit failure of the NMOS transistor M2 can be detected by thus monitoring the voltage of the output terminal of the power transmitting driver (i.e., the coil end N1 of the primary coil).

When detecting a normal failure, whether or not the voltage of the node N1 corresponds to the (alternating-current) output signal from the power transmitting driver 13 is determined. The MOS transistors M1 and M2 that form the power transmitting driver 13 are alternately turned ON during normal operation. Since the MOS transistors M1 and M2 have a very low on-resistance, a current that leaks through the detection resistors RA1 and RA2 of the waveform monitor circuit 14 can be disregarded in the same manner as in the initial failure diagnosis operation. Therefore, the switch circuit SW3 provided in the waveform monitor circuit 14 remains in an ON state during the normal failure detection operation (note that the switch SW3 may be optionally turned ON/OFF).

Figure 7C:
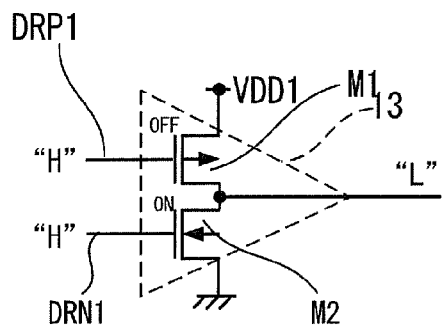
Figure 7D:
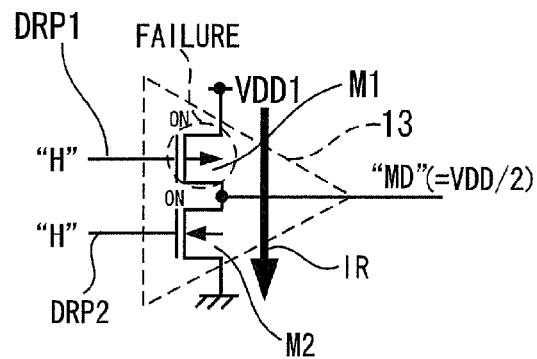

In FIG. 7C, the input signals DRP1 and DRN1 input to the power transmitting driver 13 are set at the H level. In this case, the PMOS transistor M1 should be turned OFF, and the NMOS transistor M2 should be turned ON. However, when the PMOS transistor M1 undergoes a short-circuit failure, a large amount of shoot-through current IR flows during drive (see FIG. 7D). This may cause the NMOS transistor M2 to break down so that a short circuit may occur between the power supplies.

Therefore, the potential of the output terminal of the power transmitting driver 13 (i.e., the coil end N2 of the primary coil) is monitored, and whether or not the potential corresponds to the voltage level of the input signal from the power transmitting driver 13 is detected to detect a failure.

Specifically, when the PMOS transistor M1 does not undergo a short-circuit failure, the voltage of the output terminal should be set at the L level when the signals DRP1 and DRP2 are set at the H level (see FIG. 7C). On the other hand, when the PMOS transistor M1 undergoes a short-circuit failure, the voltage of the output terminal is set at the voltage MD (e.g., a voltage half of the power supply voltage) other than the H level (see FIG. 7D). A short-circuit failure of the PMOS transistor M1 can be detected by thus monitoring the voltage of the output terminal of the power transmitting driver (i.e., the coil end N2 of the primary coil).

The failure detection circuit (reference numeral 34 in FIG. 10) performs the above-described failure detection process during normal power transmission to promptly detect a short-circuit failure that has occurred during normal power transmission. This makes it possible to promptly take appropriate measures, such as stopping power transmission and reporting the failure.

Detection of Initial Failure of Capacitor

An example of detecting a failure of the transistor that forms the power transmitting driver 13 (15) has been described above. Note that the invention is not limited thereto. According to this embodiment, an initial failure of the capacitor C2 that forms a series-resonant circuit with the primary coil (L1) can also be detected.

Figure 8:
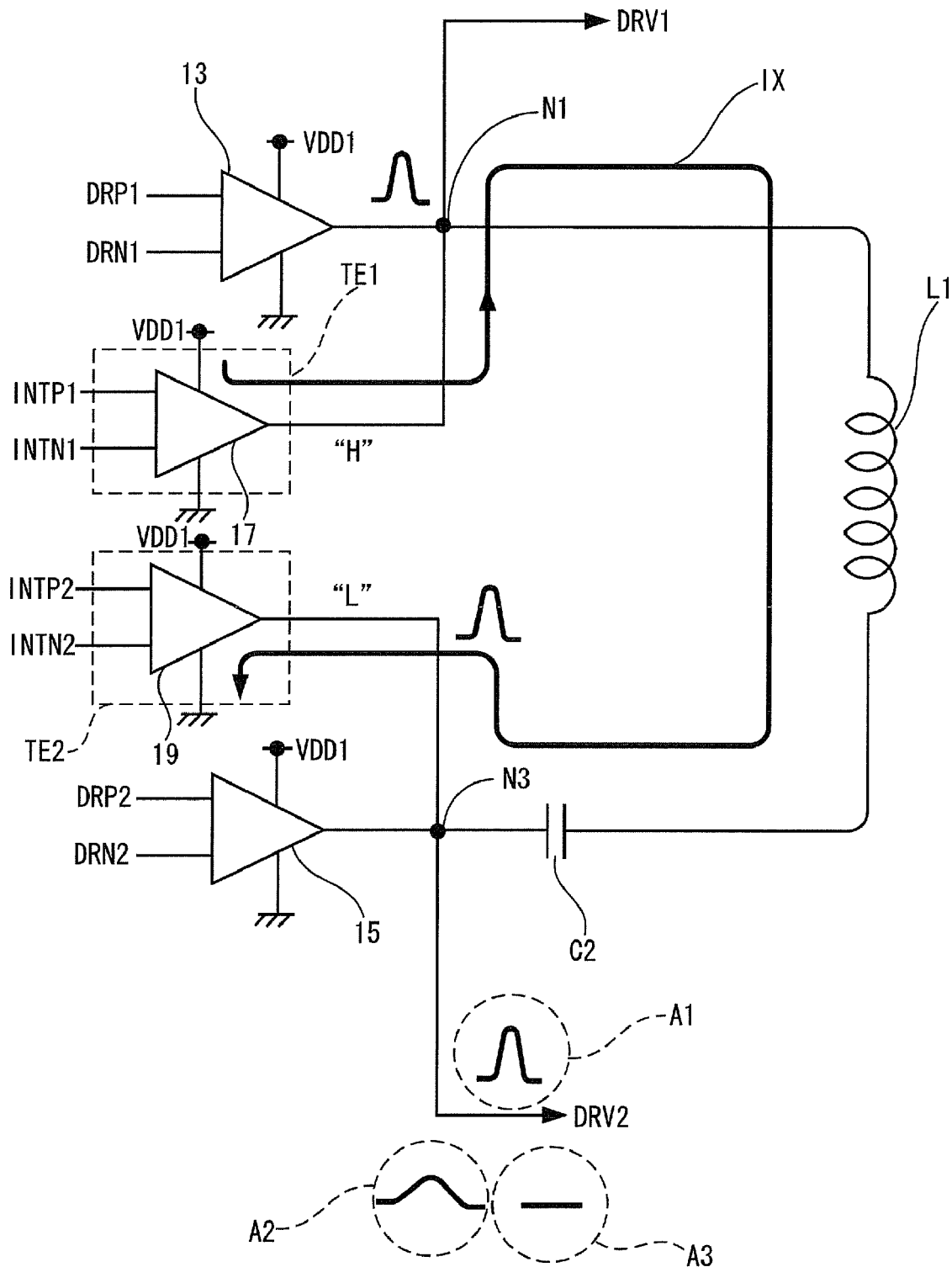
FIG. 8 is a view illustrative of the principle of detecting an initial failure of a capacitor that forms a resonant circuit.

FIG. 8 is a view illustrative of the principle of detecting an initial failure of the capacitor that forms a resonant circuit. In FIG. 8, two test drivers (TE1 and TE2) are simultaneously operated so that the voltages of two coil ends (nodes N1 and N3) are changed complementarily. As shown in FIG. 8, when the output voltage of the test driver TE1 is changed from the L level to the H level, for example, the output voltage of the test driver TE2 is (complementarily) changed from the H level to the L level in synchronization with a change in the output voltage of the test driver TE1.

An alternating-current component that has occurred due to a change in voltage flows from the node N1 to the node N3 through the capacitor C2. Therefore, it is determined that an initial failure has occurred in the capacitor C2 when an alternating-current change in the coil-end voltage due to the alternating-current component cannot be detected.

Specifically, the voltage (DRV2) of the node N3 is monitored, and the capacitor C2 is determined to be normal when an alternating-current component indicated by A1 can be detected (see the lower side of FIG. 8). When an incomplete change (see A2) is detected or a change is not observed (see A3), it is determined that an initial failure has occurred in at least part of the capacitor C2.

When an initial failure of the capacitor has been detected, the normal drive operation is disabled, and the initial failure is reported, for example. This makes it possible to promptly take appropriate measures, such as collecting and repairing the instrument, so that safety can be improved.

Coil-end Voltage Monitor Timing

In order to accurately detect a failure, it is necessary to accurately detect the voltages of the coil ends (nodes N1 and N3). In this embodiment, a monitor window circuit (switch circuit in a broad sense) is provided in order to transmit the coil-end voltage to the failure detection circuit. A timing control circuit is also provided. The monitor window circuit (switch circuit) is turned ON only in a period (stable period) in which an initial change in the coil-end voltage is suppressed so that the coil-end voltage is stable to transmit an accurate coil-end voltage to the failure detection circuit (reference numeral 34 in FIG. 10).

Figure 9A:
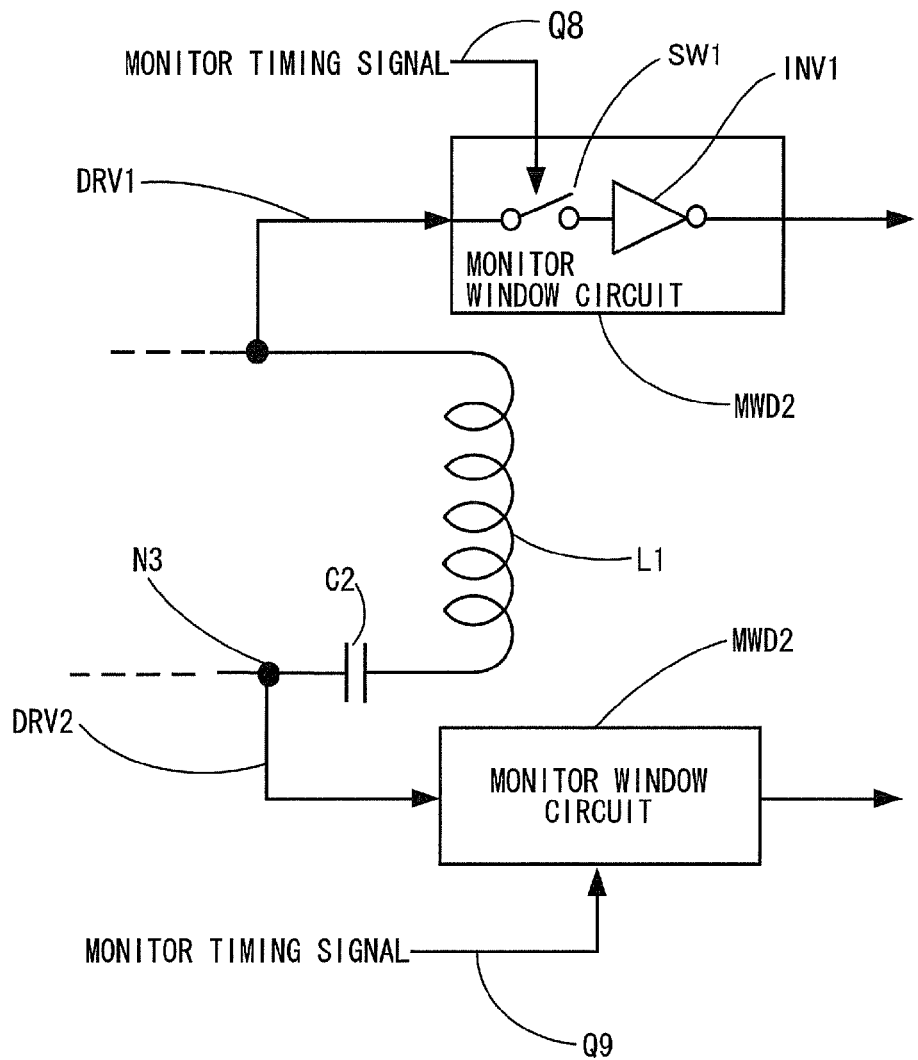
FIGS. 9A and 9B are views showing the configuration and the operation timing of a monitor window circuit (switch circuit).
Figure 9B:
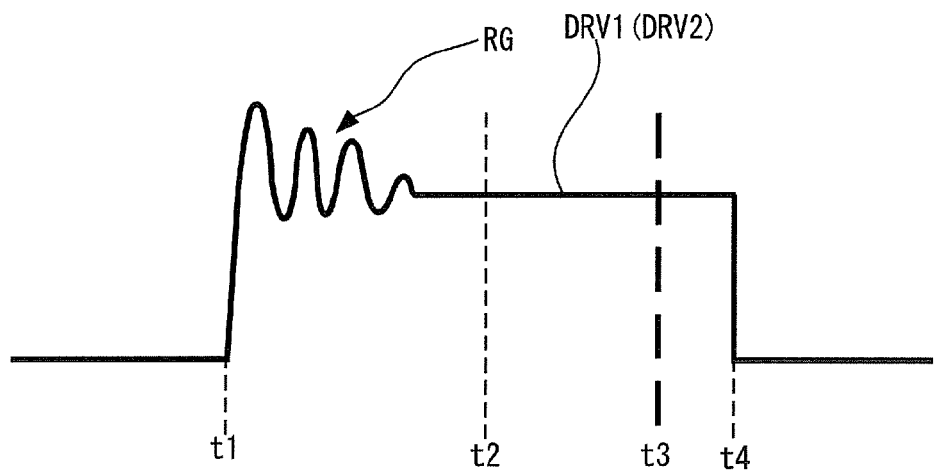

FIGS. 9A and 9B are views showing the configuration and the operation timing of the monitor window circuit (switch circuit). FIG. 9A is a view showing the configuration of the monitor window circuit, and FIG. 9B is a view showing the ON/OFF timing of the monitor window circuit.

As shown in FIG. 9A, the monitor window circuit, (MWD1: switch circuit in a broad sense) includes a switch SW1 that is ON/OFF-controlled based on a monitor timing signal (Q8), and an inverter INV1 that operates at the power supply voltage VDD1 (e.g., 5 V) of the power transmitting section 12.

A monitor window circuit (MWD2) has the same configuration as that of the monitor window circuit (MWD1). A switch of the monitor window circuit (MWD2) is ON/OFF-controlled based on a monitor timing signal (Q9). The timing control circuit (reference numeral 33 in FIG. 10) generates the monitor timing signal.

Figure 10:
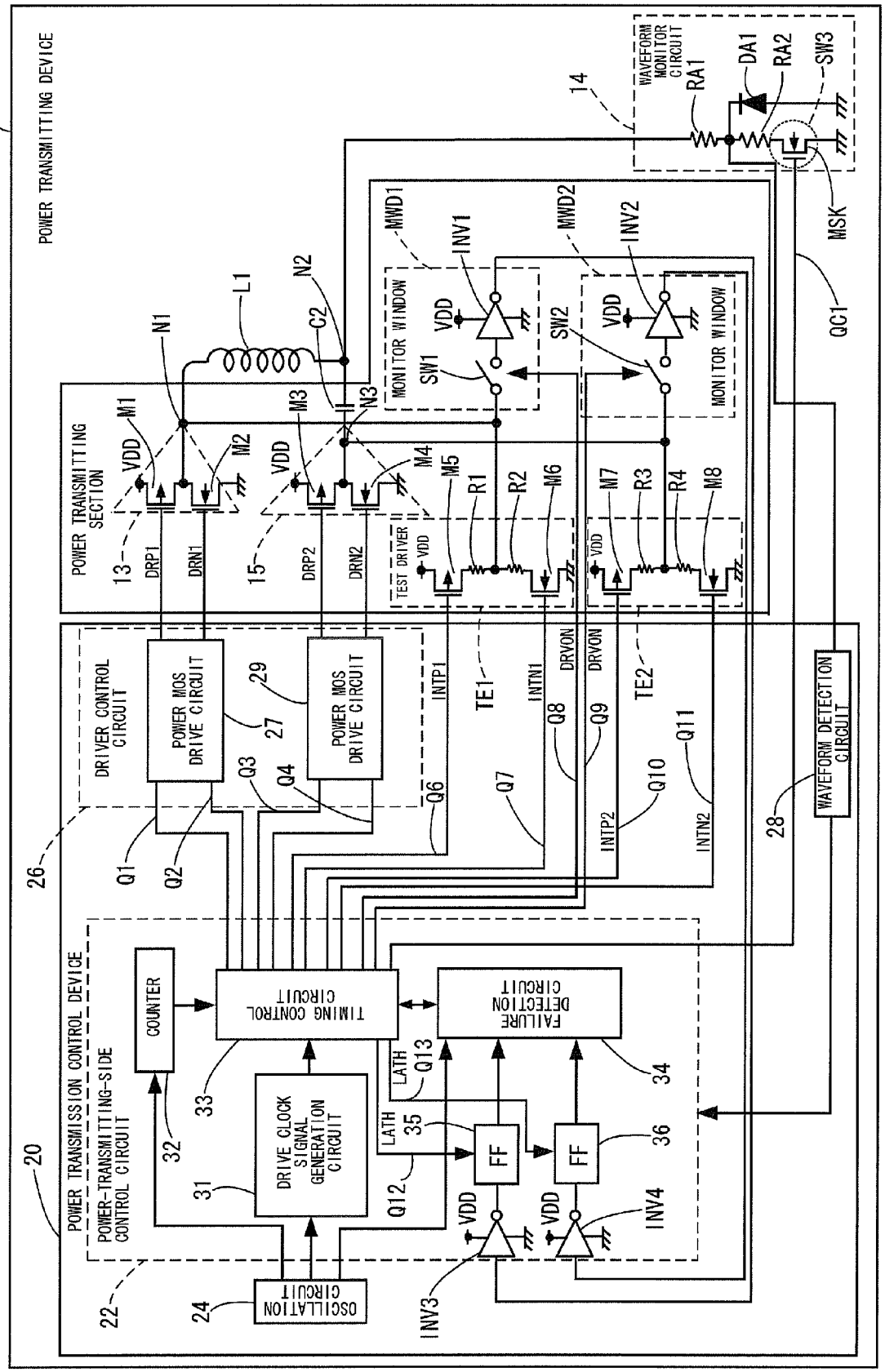
FIG. 10 is a block diagram showing an example of a specific internal circuit configuration of a power transmission control device and a power transmitting section.

It is desirable that the switch (SW1) of the monitor window circuit be turned ON in a period other than an initial change period of a high-level period (or a low-level period) of the coil-end voltage DRV1 (DRV2) so that a stable voltage is sampled and transmitted to the failure detection circuit (reference numeral 34 in FIG. 10).

Therefore, the switch (SW1) of the monitor window circuit is turned ON in the latter half period of the high-level period (or the low-level period) of the coil-end voltage DRV1 (DRV2), as shown in FIG. 9B. The term "latter half period" used herein refers to a period after an intermediate time (t2) between a start time (t1) and an end time (t4) of the high-level period (low-level period) (including the intermediate time (t2)), as shown in FIG. 9B. The latter half period is a stable period in which an initial change in voltage has ended. In FIG. 9B, the switch SW1 is turned ON at a time t3 in the latter half period so that a stable coil-end voltage is sampled and transmitted to the failure detection circuit (reference numeral 34 in FIG. 10).

SECOND EMBODIMENT

An example of a specific circuit configuration of the power transmitting section is described in this embodiment.

Example of Specific Internal Circuit Configuration of Power Transmission Control Device and Power Transmitting Section FIG. 10 is a block diagram showing an example of a specific internal circuit configuration of the power transmission control device and the power transmitting section. In FIG. 10, the same sections as in FIG. 2 are indicated by the same reference symbols. In FIG. 10, the switch SW3 is provided in the waveform monitor circuit 14. The switch SW3 is turned OFF during the initial failure diagnosis process.

In FIG. 10, the switch SW3 provided in the waveform monitor circuit 14 is formed by an NMOS transistor MSK. The NMOS transistor MSK is ON/OFF-controlled by the timing control circuit 33 provided in the power-transmitting-side control circuit 22. The operation of the timing control circuit 33 is controlled by the failure detection circuit 34.

A specific circuit configuration is described below. The power transmission control device 20 includes the oscillation circuit 24, the power-transmitting-side control circuit 22, and the driver control circuit 26. The power-transmitting-side control circuit 22 includes a drive clock signal generation circuit 31, a counter 32, the timing control circuit 33, the failure detection circuit 34, inverters INV3 and INV4 that operate at the power supply voltage (VDD2: 3 V, for example) of the power transmission control device 10, and flip-flops 35 and 36. The driver control circuit 26 includes power MOS drive circuits (27 and 29).

The power transmitting section 12 includes the power transmitting drivers (13 and 15), the test drivers (TE1 and TE2), and monitor window circuits (MWD1 and MWD2).

The timing control circuit 33 controls the operation timing of the power MOS drive circuit 27 using timing control signals Q1 and Q2 so that the HIGH/LOW change timings of the input signals (DRP1 and DRN2) input to the power transmitting driver 13 are determined. Likewise, the timing control circuit 33 controls the operation timing of the power MOS drive circuit 29 using timing control signals Q3 and Q4 so that the HIGH/LOW change timings of the input signals (DRP2 and DRN2) input to the power transmitting driver 15 are determined.

The timing control circuit 33 controls the ON/OFF timings of the transistors (M5 and M6) that form the test driver TE1 using timing control signals Q6 and Q7 (corresponding to INTP1 and INTP2 in FIG. 11).

Likewise, the timing control circuit 33 controls the ON/OFF timings of the transistors (M7 and M8) that form the test driver TE2 using timing control signals Q10 and Q11 (corresponding to INTP2 and INTN2 in FIG. 11). The switch SW3 (NMOS transistor MSK) provided in the waveform monitor circuit 14 is ON/OFF-controlled based on the switch control signal QC1. The switch SW3 (NMOS transistor MSK) is turned OFF during the initial failure diagnosis process.

The timing control circuit 33 controls the ON/OFF timings of the switches (SW1 and SW2) that form the monitor window circuits (MWD1 and MWD2) using timing signals Q8 and Q9 (corresponding to DRVON in FIG. 11). The timing control circuit 33 controls the latch timings of the flip-flops (FF35 and FF36) using timing control signals Q12 and Q13 (corresponding to a latch signal LATH in FIG. 11).

Example of Specific Operation Timing of Each Section of Power Transmitting Device FIG. 11 is a timing diagram showing an example of a specific operation timing of the power transmitting device shown in FIG. 10.

In FIG. 11, DRP1 and DRN1 indicate the input signals input to the power transmitting driver 13, DRV1 indicates the voltage (coil-end voltage) of the coil end (N1), and INTP1 and INTN2 indicate the input signals input to the test driver (TE1) and correspond to the timing control signals Q6 and Q7 shown in FIG. 10.

DRP2 and DRN2 indicate the input signals input to the power transmitting driver 15, DRV2 indicates the voltage (coil-end voltage) of the coil end (N2), and INTP2 and INTN2 indicate the input signals input to the test driver (TE2) and correspond to the timing control signals Q10 and Q11 shown in FIG. 10.

DRVON indicates ON/OFF control signals of the switches SW1 and SW2 provided in the monitor window circuits (MWD1 and MWD2) and corresponds to the timing control signals (Q8 and Q9) shown in FIG. 10. LATH indicates the latch timing control signals that control the latch timings of the flip-flops (FF35 and FF36) shown in FIG. 10 and corresponds to the timing control signals Q12 and Q13 shown in FIG. 10.

In FIG. 11, a period indicated by diagonal lines indicates a period in which a plurality of transistors that determine the potential at a given location are turned OFF (i.e., the potential cannot be specified). In FIG. 11, the voltage change timings of the PMOS transistor and the NMOS transistor that form the CMOS driver are shifted to prevent a situation in which the PMOS transistor and the NMOS transistor are simultaneously turned ON so that a large amount of shoot-through current flows.

In FIG. 11, a period T10 (period up to a time t37) is an initial failure monitor period, a period T20 (from a time t37 to a time t38) is an initial failure determination period, and a period T30 (from a time t38 to a time t51) is a normal power transmission period (normal failure determination period).

An initial failure detection process is described below. In a period in which the initial failure detection process is performed, the switch control signal QC1 is set at the L level so that the switch SW3 provided in the waveform monitor circuit 14 is turned OFF. This prevents a situation in which an unnecessary direct current flows to implement reliable initial failure detection. In a normal failure detection process, the switch control signal QC1 is set at the H level so that the switch SW3 provided in the waveform monitor circuit 14 remains in an ON state.

In the initial failure detection period (period up to the time t39), the power transmitting drivers 13 and 15 are turned OFF, and the test drivers (TE1 and TE2) are turned ON. Therefore, the input signals DRP1 and DRN1 input to the power transmitting driver TE1 are respectively set at the H level and the L level, and the input signals DRP2 and DRN2 input to the power transmitting driver TE2 are respectively set at the H level and the L level so that the output terminals of the power transmitting drivers 13 and 15 are set in a floating state. The switch control signal QC1 is set at the L level in a period up to the time t38 at which the initial failure diagnosis process ends. As a result, the switch SW3 (NMOS transistor MSK) is turned OFF during the initial failure diagnosis process so that a situation in which an unnecessary direct current flows from the node N1 to ground can be prevented.

The input signal INTP1 (Q6) input to the test driver TE1 changes from the L level to the H level at the time t32, and the input signal INTN1 (Q7) changes from the L level to the H level at the time t33. The input signal INTN1 (Q7) returns to the L level at the time t36.

Likewise, the input signal INTP2 (Q10) input to the test driver TE2 changes from the H level to the L level. The input signal INTP2 (Q10) returns to the H level at the time t37. The input signal INTN2 (Q11) changes from the H level to the L level at the time t33.

The voltage DRV1 of the first coil end (N1) is set at the H level in a period from the time t33 to the time t36. Likewise, the voltage DRV2 of the second coil end (N2) is set at the L level in a period from the time t33 to the time t37. Specifically, the first and second coil ends (N1 and N2) are driven synchronously and complementarily.

The ON/OFF timing control signals DRVON (Q8 and Q9) of the switches SW1 and SW2 of the monitor window circuits (MWD1 and MWD2) are activated at the time t34 so that the switches SW1 and SW2 are turned ON and the coil-end voltages (DRV1 and DRV2) are sampled. The time t34 belongs to the latter half period of the low-level period (t33 to t36) of the coil-end voltage DRV1 and the high-level period (t33 to t37) of the coil-end voltage DRV2, as described above.

The latch timing control signal (LATH) is activated at the time t35 so that the voltages (coil-end voltages: DRV1 and DRV2) of the coil ends (N1 and N2) are latched by the flip-flops (FF35 to FF36).

The failure detection circuit 34 determines whether or not the voltages latched by the flip-flops FF35 to FF36 coincide with the output voltage levels of the test drivers TE1 and TE2 in the period T20 (t37 to t38) to determine whether or not an initial failure has occurred in the power transmitting drivers 13 and 15.

In this embodiment, a normal failure is detected during normal power transmission.

The switch control signal QC1 is set at the high level in the normal power transmission period (period T30). Since the test drivers TE1 and TE2 are not used in the normal power transmission period (T30), the signals INTP1 (Q6) and INTP2 (Q10) are fixed at the H level, and the signals INTN1 (Q7) and INTN2 (Q11) are fixed at the L level.

The signals DRP1 and DRN1 are alternately set at the H level and the L level, and the signals DRP2 and DRN2 are alternately set at the H level and the L level. The first and second coil ends (N1 and N2) of the primary coil are complementarily driven by the power transmitting drivers 13 and 15 so that normal power transmission (normal-power continuous power transmission) is performed. The voltage DRV1 of the coil end (N1) is set at the H level from the time t38 to the time t42, and the voltage DRV2 of the coil end (N2) is set at the L level from the time t39 to the time t42.

The monitor window circuits (MWD1 and MWD2) sample the voltage DRV1 set at the H level and voltage DRV2 set at the L level at the time t40. The sampled voltages are latched by the flip-flops (FF35 and FF36) at the time t41. The voltage DRV1 of the coil end (N1) is set at the L level from the time t43 to the time t46, and the voltage DRV2 of the coil end (N2) is set at the H level from the time t43 to the time t46. The monitor window circuits (MWD1 and MWD2) sample the voltage DRV1 set at the L level and voltage DRV2 set at the H level at the time t44. The sampled voltages are latched by the flip-flops (FF35 and FF36) at the time t45.

The above-described operation is repeated. Specifically, the voltages of the coil ends (N1 and N2) are sampled intermittently during normal power transmission, and latched by the flip-flops (FF35 and FF36). Whether or not the latched voltage has a voltage level corresponding to each input signal of the power transmitting drivers 13 and 15 is regularly checked. Therefore, when a normal failure has occurred, the failure is detected promptly.

When a normal failure has been detected, an error is reported. The power transmitting device 10 is then reset so that normal power transmission is stopped. The power transmitting device 10 is turned ON after a given period has elapsed. If a failure is detected again, the failure is reported without performing normal power transmission, and the power transmitting device 10 is repaired or discarded.

According to several embodiments of the invention, the following effects can be obtained, for example. Note that the following effects are not necessarily achieved at the same time. Accordingly, the following effects do not in any way limit the scope of the invention.

(1) Even when the power transmitting section is configured so that a capacitor is not connected to the first node of the primary coil and the resonant capacitor is connected to only the second node to form a series-resonant circuit, an unnecessary direct current does not flow from the first node to ground through another circuit (e.g., waveform monitor circuit) electrically connected to the primary coil during the power transmitting driver initial failure diagnosis process. Therefore, a short-circuit failure of the power transmitting driver can be reliably detected by monitoring the coil-end voltage of the primary coil and determining whether or not the coil-end voltage corresponds to the input voltage of the power transmitting driver. Therefore, the safety of the power transmitting device and the non-contact power transmission system can be improved. Moreover, a reduction in capacitor signal loss, a reduction in number of parts, and a reduction in mounting area of the power transmitting section can be achieved by reducing the number of capacitors.

(2) An unnecessary direct current can be completely blocked by providing a switch in another circuit (e.g., waveform monitor circuit) and causing the switch to be turned OFF during the initial failure diagnosis process. This reliably prevents erroneous detection (determination).

(3) When a plurality of signal paths through which a direct current flows from the first node to ground are present in parallel, a reliable initial failure diagnosis process is ensured by providing a switch circuit in each signal path.

(4) Since an initial failure of the driver that drives the primary coil can be detected and the failure can be reported or the instrument can be collected or repaired without performing normal power transmission, the safety of the non-contact power transmission system is further improved.

(5) The safety of the non-contact power transmission system is further improved by detecting a failure of the power transmitting driver during normal power transmission and stopping power transmission or reporting the failure in addition to detecting an initial failure.

(6) A highly safe power transmitting section for the non-contact power transmission system can be implemented.

(7) A highly safe non-contact power transmission system can be implemented. This contributes to wide-spread use of the non-contact power transmission technology.

Although only some embodiments of the invention have been described in detail above, those skilled in the art would readily appreciate that many modifications are possible in the embodiments without materially departing from the novel teachings and advantages of the invention. Specifically, various modifications are possible without materially departing from the novel teachings and advantages of the invention.

Accordingly, such modifications are intended to be included within the scope of the invention. Any term (e.g., GND and portable telephone/charger) cited with a different term (e.g., low-potential-side power supply and electronic instrument) having a broader meaning or the same meaning at least once in the specification and the drawings can be replaced by the different term in any place in the specification and the drawings. Any combinations of the embodiments and the modifications are also included within the scope of the invention.

The configurations and the operations of the power transmission control device, the power transmitting device, the power reception control device, and the power receiving device, and the power-receiving-side load detection method employed for the power-transmitting-side instrument are not limited to those described relating to the above embodiments. Various modifications and variations may be made.

The invention enables a failure of the power transmitting driver to be reliably detected even when the capacitor is connected to only one end of the primary coil to form a series-resonant circuit to improve the reliability and safety of the small non-contact power transmission system in which the number of parts is reduced. Therefore, the invention is useful for a power transmission control device (power transmission control IC), a non-contact power transmission system, a power transmitting device (e.g., IC module), an electronic instrument (e.g., portable terminal and charger), a waveform monitor circuit, and the like. Note that the term "portable terminal" includes a portable telephone terminal, a PDA terminal, and a portable computer terminal.

What is claimed is:

1. A power transmission control device provided in a power transmitting device of a non-contact power transmission system, the non-contact power transmission system transmitting power from the power transmitting device to a power receiving device by electromagnetically coupling a primary coil and a secondary coil to transmit the power to a load of the power receiving device, the power transmission control device comprising:
 a power-transmitting-side control circuit that controls an operation of the power transmitting device;
 a driver control circuit that controls operations of a first power transmitting driver and a second power transmitting driver provided in a power transmitting section of the power transmitting device; and
 a waveform detection circuit that performs a waveform detection process based on a monitor signal from a waveform monitor circuit that monitors at least one of a voltage and a current of the primary coil,
 the first power transmitting driver driving a first node of the primary coil directly, and the second power transmitting driver driving a second node of the primary coil through a capacitor;
 a switch circuit being provided in the waveform monitor circuit, the switch circuit being situated in a signal path between the primary coil and a low-level power supply potential; and
 the power-transmitting-side control circuit causing the switch circuit to be turned ON/OFF using a switch control signal.

2. The power transmission control device as defined in claim 1,
 the switch circuit being provided in each of a plurality of signal paths that are provided in the waveform monitor circuit and situated between the primary coil and the low-level power supply potential.

3. The power transmission control device as defined in claim 1,
 the power transmitting section including a first test driver that drives the first node of the primary coil, and a second test driver that drives a third node, the third node being a common connection node of an output node of the second power transmitting driver and one electrode of the capacitor,
 the power-transmitting-side control circuit causing the switch circuit to be turned OFF using the switch control signal when detecting an initial failure of the first power transmitting driver and the second power transmitting driver using the first test driver and the second test driver.

4. The power transmission control device as defined in claim 3,
 the power-transmitting-side control circuit setting input signals input to the first power transmitting driver and the second power transmitting driver at such levels that the first node and the third node of the primary coil are set in a floating state, then causing the first test driver and the second test driver to drive the first node and the third node of the primary coil respectively, and determining that an initial failure has occurred in the first power transmitting driver or the second power transmitting driver when a voltage of the first node or the third node is not a voltage corresponding to a drive output level of the first test driver or the second test driver.

5. A non-contact power transmission system comprising a power transmitting device and a power receiving device, the non-contact power transmission system transmitting power from the power transmitting device to the power receiving device by electromagnetically coupling a primary coil and a secondary coil to transmit the power to a load of the power receiving device,
 the power transmitting device including:
 a power transmitting section that includes a first power transmitting driver and a second power transmitting driver;
 a power transmission control device that controls an operation of the power transmitting device; and
 a waveform monitor circuit that monitors at least one of a voltage and a current of the primary coil,
 a switch circuit being provided in the waveform monitor circuit, the switch circuit being situated in a signal path between the primary coil and a low-level power supply potential,
 the power transmission control device including:
 a power-transmitting-side control circuit that controls an operation of the power transmitting device;
 a driver control circuit that controls operations of the first power transmitting driver and the second power transmitting driver; and
 a waveform detection circuit that performs a waveform detection process based on a monitor signal from the waveform monitor circuit,
 the first power transmitting driver driving a first node of the primary coil directly, and the second power transmitting driver driving a second node of the primary coil through a capacitor,
 the power-transmitting-side control circuit causing the switch circuit provided in the waveform monitor circuit to be turned ON/OFF using a switch control signal; and
 the power receiving device including:
 a power receiving section that includes a rectifier circuit that rectifies an induced voltage in the secondary coil;
 a load modulation section that is used to transmit data from the power receiving device to the power transmitting device; and
 a power supply control section that controls power supply to the load.

6. The non-contact power transmission system as defined in claim 5,
 the switch circuit being provided in each of a plurality of signal paths that are provided in the waveform monitor circuit and situated between the primary coil and the low-level power supply potential.

7. The non-contact power transmission system as defined in claim 5,
 the power transmitting section including a first test driver that drives the first node of the primary coil, and a second test driver that drives a third node, the third node being a common connection node of an output node of the second power transmitting driver and one electrode of the capacitor,
 the power-transmitting-side control circuit causing the switch circuit to be turned OFF using the switch control signal when detecting an initial failure of the first power transmitting driver and the second power transmitting driver using the first test driver and the second test driver.

8. The non-contact power transmission system as defined in claim 7,
 the power-transmitting-side control circuit setting input signals input to the first power transmitting driver and the second power transmitting driver at such levels that the first node and the third node of the primary coil are set in a floating state, then causing the first test driver and the second test driver to drive the first node and the third node of the primary coil respectively, and determining that an initial failure has occurred in the first power transmitting driver or the second power transmitting driver when a voltage of the first node or the third node is not a voltage corresponding to a drive output level of the first test driver or the second test driver.

9. A power transmitting device comprising:

the power transmission control device as defined in claim 1;

the power transmitting section that includes the first power transmitting driver and the second power transmitting driver that drive the primary coil; and the waveform monitor circuit that includes the switch circuit.

10. A power transmitting device comprising:

the power transmission control device as defined in claim 3;

the power transmitting section that includes the first power transmitting driver and the second power transmitting driver that drive the primary coil, the first test driver that drives the first node of the primary coil, and the second test driver that drives the second node of the primary coil; and the waveform monitor circuit that includes the switch circuit.

11. An electronic instrument comprising the power transmitting device as defined in claim 9.

12. An electronic instrument comprising the power transmitting device as defined in claim 10.

* * * * *